(12) United States Patent
Wakabayashi et al.

(10) Patent No.: US 8,603,611 B2
(45) Date of Patent: Dec. 10, 2013

(54) TRANSPARENT PLANAR BODY AND TRANSPARENT TOUCH SWITCH

(75) Inventors: Naohiro Wakabayashi, Moriyama (JP); Tsutomu Yamada, Moriyama (JP); Kuniaki Sasaki, Moriyama (JP); Shuji Furukawa, Kameoka (JP); Keiji Tsukamoto, Kameoka (JP)

(73) Assignee: Gunze Limited, Kyoto (JP)

( * ) Notice: Subject to any disclaimer, the term of this patent is extended or adjusted under 35 U.S.C. 154(b) by 1132 days.

(21) Appl. No.: 11/795,009

(22) PCT Filed: May 24, 2006

(86) PCT No.: PCT/JP2006/010383
§ 371 (c)(1),
(2), (4) Date: Jan. 15, 2008

(87) PCT Pub. No.: WO2006/126604
PCT Pub. Date: Nov. 30, 2006

(65) Prior Publication Data
US 2008/0138589 A1    Jun. 12, 2008

(30) Foreign Application Priority Data

| May 26, 2005 | (JP) | 2005-153356 |
| Jun. 17, 2005 | (JP) | 2005-178310 |
| Mar. 17, 2006 | (JP) | 2006-73705 |
| Mar. 31, 2006 | (JP) | 2006-96980 |

(51) Int. Cl.
*G06F 3/044* (2006.01)
*G06F 3/041* (2006.01)
*H01B 5/14* (2006.01)

(52) U.S. Cl.
USPC ...................................... 428/195.1

(58) Field of Classification Search
USPC ............................................ 428/195.1
See application file for complete search history.

(56) References Cited

U.S. PATENT DOCUMENTS

| 6,617,056 B1 | 9/2003 | Hara et al. |
| 7,294,395 B2 * | 11/2007 | Itoh et al. ...................... 428/327 |
| 2002/0086188 A1 | 7/2002 | Halsey et al. |

(Continued)

FOREIGN PATENT DOCUMENTS

| JP | 2-030024 A | 1/1990 |
| JP | A-04-154647 | 5/1992 |

(Continued)

OTHER PUBLICATIONS

Office Action dated Feb. 20, 2009 in corresponding Chinese patent application No. 200680004693.5 (and English translation).

(Continued)

*Primary Examiner* — Mark Ruthkosky
*Assistant Examiner* — Ian Rummel
(74) *Attorney, Agent, or Firm* — Posz Law Group, PLC

(57) ABSTRACT

The present invention provides a transparent planar body and a transparent touch switch that can improve visibility. Specifically, the transparent planar body (1) has a patterned transparent conductive film (12) on at least one surface of a transparent substrate (11). This transparent planar body (1) comprises a transmittance-adjusting layer for equalizing the transmission spectrum of light transmitted through a patterned region wherein the transparent conductive film (12) is provided via the transparent substrate (11) with that transmitted through a non-patterned region wherein the transparent conductive film (12) is not provided via the transparent substrate (11).

10 Claims, 31 Drawing Sheets

(56) References Cited

U.S. PATENT DOCUMENTS

| | | | |
|---|---|---|---|
| 2004/0071889 A1* | 4/2004 | Asakawa et al. | 427/402 |
| 2004/0151895 A1 | 8/2004 | Itoh et al. | |
| 2004/0175562 A1* | 9/2004 | Hayashi et al. | 428/330 |
| 2004/0246238 A1 | 12/2004 | Oya et al. | |
| 2005/0083307 A1 | 4/2005 | Aufderheide et al. | |
| 2009/0039878 A1 | 2/2009 | Oya et al. | |

FOREIGN PATENT DOCUMENTS

| | | |
|---|---|---|
| JP | A-07-242442 | 9/1995 |
| JP | A-2000-089914 | 3/2000 |
| JP | A-2000-301648 | 10/2000 |
| JP | A-2001-324707 | 11/2001 |
| JP | 2003-136625 | 5/2003 |
| JP | 2003-173238 | 6/2003 |
| JP | 2003-197034 A | 7/2003 |
| JP | 2003-197035 | 7/2003 |
| JP | A-2004-005102 | 1/2004 |
| JP | A-2004-152727 | 5/2004 |
| TW | 489019 | 6/2002 |
| TW | 565730 | 12/2003 |
| TW | 590890 | 6/2004 |

OTHER PUBLICATIONS

Taiwan IPO Search Report issued Mar. 2, 2010 in the corresponding Taiwanese patent application No. 095118911.

Information statement filed for corresponding Japanese Patent Application No. 2007-264695 (English translation enclosed).

Office Action mailed Aug. 30, 2011 in corresponding JP application No. 2007-264695.

Supplementary European Search Report dated Feb. 15, 2013 in corresponding EP patent application No. 06 74 6812.

* cited by examiner (a)    (b)

Fig.7
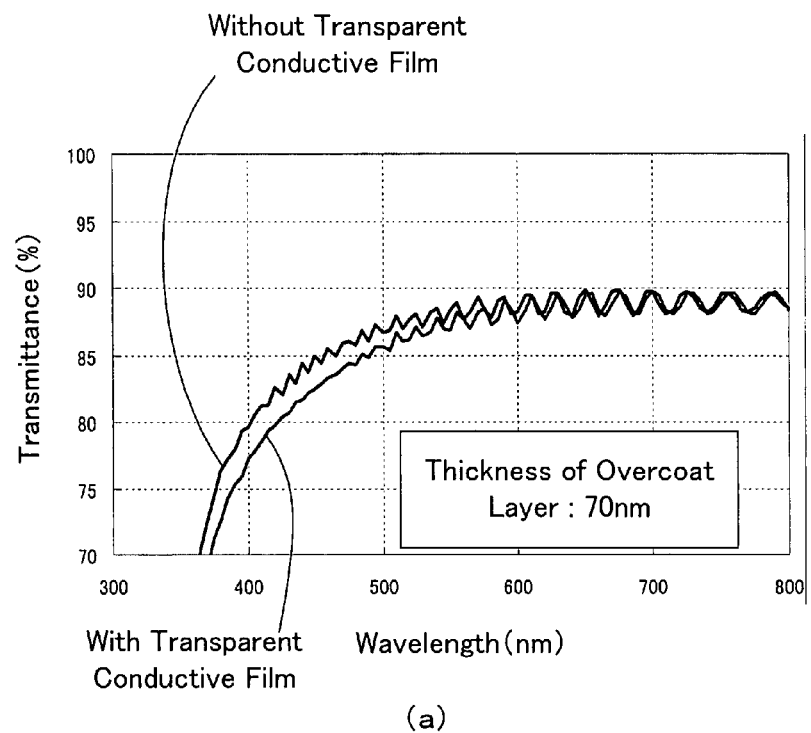
(a)
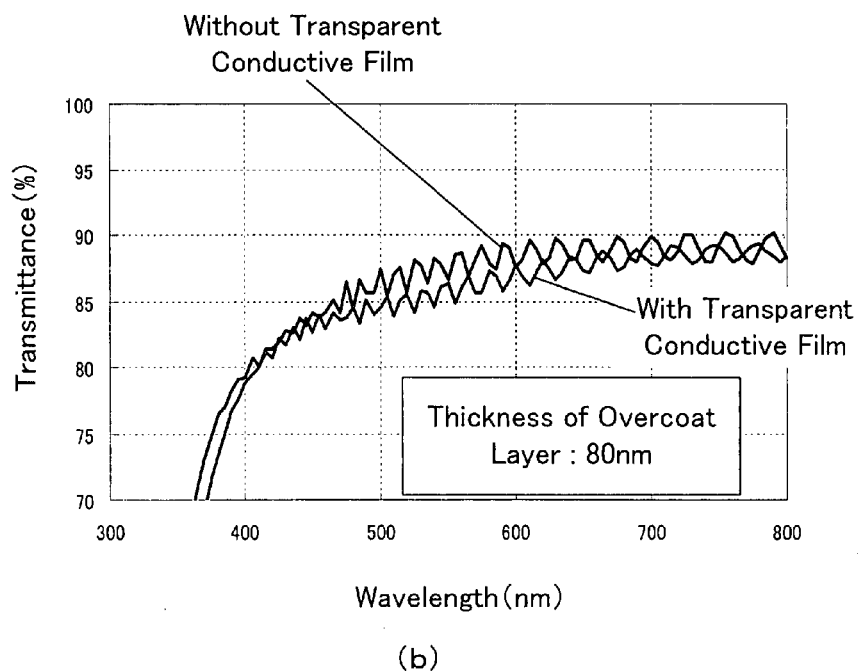
(b)

Fig.19
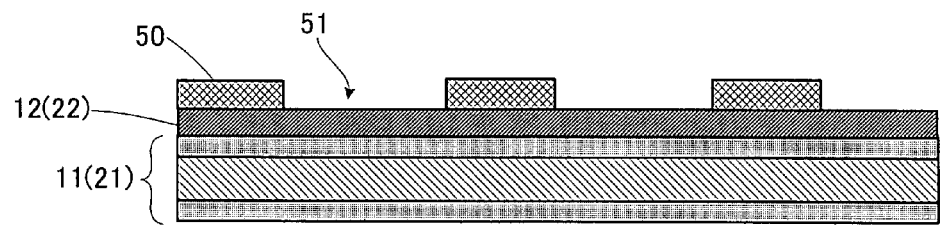
(a)
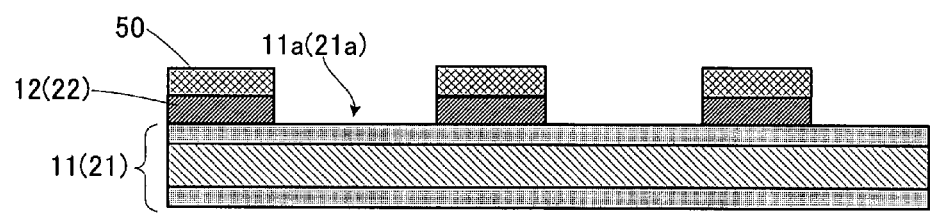
(b)
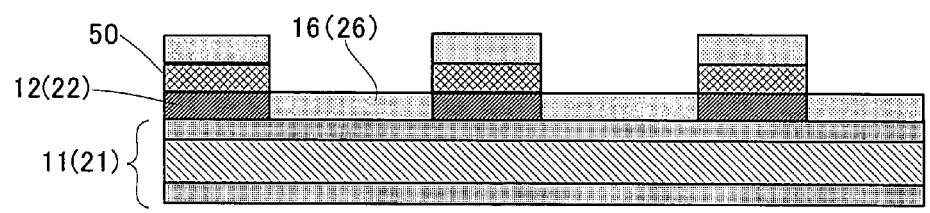
(c)
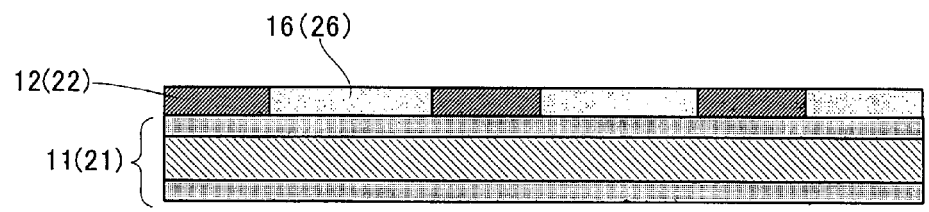
(d)

TRANSPARENT PLANAR BODY AND TRANSPARENT TOUCH SWITCH

TECHNICAL FIELD

The present invention relates to a transparent planar body and a transparent touch switch.

BACKGROUND OF THE INVENTION

Various structures for transparent touch switches that can detect input position have been proposed such as a transparent electrostatic capacitive touch switch. For example, Patent Document 1 discloses a transparent touch switch comprising a dielectric layer lying between a pair of transparent planar bodies each provided with a transparent conductive film patterned into a predetermined shape. When an operator touches the operation surface with a finger, etc., the transparent touch switch detects the touched position by sensing the change of electric capacity via grounding through a human body.

Such a transparent touch switch is mounted on the surface of a liquid crystal display apparatus, CRT or the like. In this structure, the shape of the pattern of the transparent electric conduction film that is formed in the transparent planar body becomes conspicuous, lowering visibility of the touch switch.

A transparent conductive film disclosed in Patent Document 2 is one example of the known transparent planar body. The transparent conductive film comprises an undercoat layer between a conductive-layer formation film and a conductive layer. The undercoat layer is formed from two layers having different refractive indices. Specifically, a highly refractive zinc oxide/tin oxide film having a thickness of 600 Å is disposed near the conductive-layer formation film and a lower refractive silicon oxide film having a thickness of 450 Å is disposed near the conductive layer.

When this transparent conductive film is used as a transparent electrostatic capacitive touch switch, the pattern shape of the conductive layer also becomes conspicuous, and therefore there is room for improvement in this respect.

[Patent Document 1] Japanese Unexamined Patent Publication No. 2003-173238 (FIGS. 1 and 5)

[Patent Document 2] Japanese Unexamined Patent Publication No. 2003-197035 (Table 1)

SUMMARY OF THE INVENTION

Problem to be Solved by the Invention

An object of the present invention is to provide a transparent planar body and a transparent touch switch that have improved visibility.

Means for Solving the Problem

The object of the present invention can be achieved by a transparent planar body comprising a transparent substrate; a patterned transparent conductive film formed on at least one surface of the transparent substrate; and a transmittance-adjusting layer for equalizing the transmission spectrum of light that is transmitted through a patterned region where the transparent conductive film is provided via the transparent substrate with that transmitted through a non-patterned region where the transparent conductive film is not provided.

It is preferable that, in the transparent planar body, the transmittance-adjusting layer be provided with an overcoat layer covering one surface of the transparent substrate with a substantially uniform thickness, and the overcoat layer be thicker than the transparent conductive film and have a lower refractive index than the transparent conductive film.

It is preferable that the overcoat layer be formed of a silicon-tin oxide.

It is also preferable that the overcoat layer have a thickness of 70 to 80 nm.

It is preferable that the difference in refractive index between the transparent conductive film and the overcoat layer be 0.03 to 0.4.

A preferable structure is achieved when an undercoat layer lies between the transparent substrate and the transparent conductive film, wherein the undercoat layer is formed from a laminate comprising at least two layers having different light refractive indices, and the transparent conductive film is formed on the low refractive index layer side.

The object of the present invention can be achieved with a transparent touch switch comprising a plurality of transparent planar bodies, wherein the plurality of transparent planar bodies are attached to each other via an adhesive layer and function as a transparent electrostatic capacitive touch switch, and the refractive index of the adhesive layer is less than that of the transparent conductive film.

In this transparent touch switch, it is preferable that a linear polarizing plate be provided on the front side.

It is also preferable that the transparent touch switch comprise a linear polarizing plate and a quarter-wave plate on the front side and a quarter-wave plate on the back side.

It is also preferable that the transparent substrate be a quarter-wave plate.

It is preferable that, in the transparent planar body, the transmittance-adjusting layer be provided with an undercoat layer formed from a laminate comprising a low refractive index layer and a high refractive index layer whose light refractive index is higher than that of the low refractive index layer, wherein the undercoat layer lies between the transparent substrate and the transparent conductive film in such a manner that the transparent conductive film is formed on the low refractive index layer side, and the high refractive index layer is thinner than the low refractive index layer.

It is preferable that the high refractive index layer have a thickness of 10 to 25 nm and the low refractive index layer have a thickness of 25 to 45 nm.

It is preferable that the high refractive index layer be formed of a silicon-tin oxide and the low refractive index layer be formed of a silicon oxide.

It is also preferable that the transparent conductive film have a thickness of 10 to 25 nm The object of the present invention can be achieved by a transparent electrostatic capacitive touch switch comprising a plurality of transparent planar bodies attached to each other via an adhesive layer.

The object of the present invention can also be achieved by a transparent electrostatic capacitive touch switch comprising a plurality of transparent planar bodies, wherein each of the plurality of transparent planar bodies is disposed in such a manner that the transparent conductive films thereof face each other and the plurality of transparent planar bodies are attached to each other having an adhesive layer therebetween. The thickness of the transparent conductive film is 20 to 25 nm, and the refractive index of the adhesive layer is not less than 1.6.

The object of the present invention can also be achieved by a transparent electrostatic capacitive touch switch comprising a plurality of transparent planar bodies, wherein each of the plurality of transparent planar bodies is disposed in such a manner that the transparent conductive films thereof face each other and the plurality of transparent planar bodies are attached to each other having an adhesive layer therebetween, wherein the thickness of the transparent conductive film is 25 to 30 nm, and the refractive index of the adhesive layer is not less than 1.7.

In such transparent touch switches, it is preferable that a linear polarizing plate be provided on the front side.

It is also preferable that such transparent touch switch be provided with a linear polarizing plate and a quarter-wave plate on the front side and a quarter-wave plate on the back side.

It is also preferable that the transparent substrate be a quarter-wave plate.

In the transparent planar body, it is preferable that the transmittance-adjusting layer comprise a cover layer to cover an exposed portion where the transparent conductive film is not formed on one surface of the transparent substrate, wherein the cover layer be formed so that the surface thereof is flush with the surface of the transparent conductive film, and the refractive index of the cover layer be the substantially same as that of the transparent conductive film.

It is preferable that the cover layer be formed of a silicon-tin oxide.

It is preferable that the transparent conductive film be formed of a carbon nanotube composite material.

It is preferable that the transparent planar body further comprise an undercoat layer that is formed of a laminate of a low refractive index layer and a high refractive index layer having a light refractive index higher than that of the low refractive index layer, wherein the undercoat layer lies between the transparent conductive film and the cover layer and the transparent substrate, i.e., the undercoat layer lies on the transparent conductive film and under the cover layer and the transparent substrate, so that the transparent conductive film and the cover layer are disposed on the low refractive index layer side.

It is preferable that the transparent planar body further comprise an overcoat layer covering the surfaces of the transparent conductive film and the cover layer, wherein the overcoat layer has a flat surface.

The object of the present invention can also be achieved by the transparent electrostatic capacitive touch switch comprising a plurality of transparent planar bodies, wherein the plurality of transparent planar bodies are attached to each other via an adhesive layer.

The object of the present invention can also be achieved by a transparent resistive film-type touch switch comprising a plurality of transparent planar bodies arranged in such a manner that the transparent conductive films face each other and the transparent planar bodies have a predetermined space therebetween via a spacer.

In such transparent touch switches, it is preferable that a linear polarizing plate be provided on the front side.

It is also preferable that a linear polarizing plate and a quarter-wave plate be provided on the front side and a quarter-wave plate be provided on the back side.

It is also preferable that the transparent substrate be a quarter-wave plate.

It is also preferable that the transparent conductive film comprise a plurality of belt-like transparent conductive members disposed with a predetermined space therebetween, the transmittance-adjusting layer comprise a belt-like transparent controlling member disposed between two belt-like transparent conductive members via an insulating slit in between, and the belt-like transparent controlling member be formed of the same material as that of the belt-like transparent conductive member and comprise a plurality of resistive slits.

It is also preferable that, in the transparent planar body, the plurality of resistive slits be arranged so as to connect one insulating slit to another those adjacent to each belt-like transparent controlling members.

It is also preferable that a transparent planar body further comprise a separating slit disposed along the insulating slit so as to separate each belt-like transparent controlling member.

The object of the present invention can be achieved by a transparent electrostatic capacitive touch switch comprising a plurality of transparent planar bodies, wherein each transparent planar body is attached to each other via an adhesive layer.

The object of the present invention can be achieved by a transparent resistive film-type touch switch comprising a plurality of transparent planar bodies, wherein the plurality of transparent planar bodies are arranged so as to have a predetermined space therebetween produced by a spacer so that the belt-like transparent electric conductors face each other.

It is preferable that such a transparent touch switch comprise a linear polarizing plate on the front side.

It is also preferable that a linear polarizing plate and a quarter-wave plate be provided on the front side and a quarter-wave plate be provided on the back side.

It is also preferable that the transparent substrate be a quarter-wave plate.

EFFECT OF THE INVENTION

The present invention provides a transparent planar body and a transparent touch switch that can improve visibility.

BRIEF DESCRIPTION OF THE DRAWINGS

FIG. 7 illustrates the transmission spectra of the measurement samples shown in FIG. 6.

FIGS. 19(a) to 19(d) are explanatory views illustrating a method for forming a cover layer by a dry coating method.

EXPLANATION OF REFERENCE NUMERALS

Figure 1:
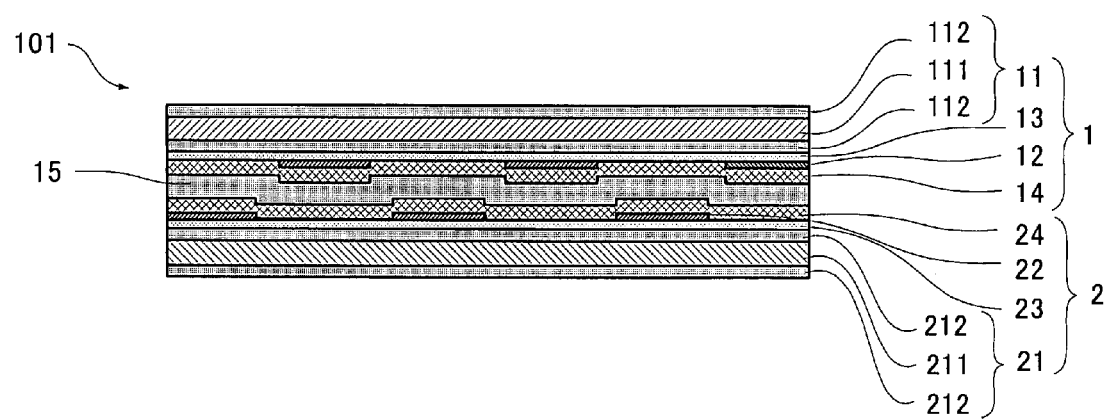
FIG. 1 is a schematic cross-sectional view showing the transparent touch switch according to the first embodiment of the present invention.

101 Transparent touch switch
1 First transparent planar body
2 Second transparent planar body
11, 21 Transparent substrate
12, 22 Transparent conductive film
13, 23 Undercoat layer
14, 24 Overcoat layer
15 Adhesive layer
16, 26 Cover layer
32, 42 Belt-like transparent conductive member
33, 43 Belt-like transparent controlling member
34, 44 Insulating slit
35, 45 Resistive slit
36, 46 Separating slit

BEST MODE FOR CARRYING OUT THE INVENTION

First Embodiment

Hereunder, the first embodiment of the present invention are explained with reference to the drawings attached. To make the structure easier to understand, each component in the attached drawings is partially expanded or reduced and thus not shown to actual scale.

FIG. 1 is a schematic cross-sectional view showing the transparent touch switch of the first embodiment of the present invention. The transparent touch switch 101 is an electrostatic capacitive touch switch comprising a first transparent planar body 1 wherein a transparent conductive film 12 is formed on a transparent substrate 11 via an undercoat layer 13, and a second transparent planar body 2 wherein a transparent conductive film 22 is formed on a transparent substrate 21 via an undercoat layer 23. The first transparent planar body 1 and the second transparent planar body 2 are attached to each other via an adhesive layer 15 in such a manner that the transparent conductive films 12 and 22 face each other.

The transparent substrates 11 and 21 are structured so that hard-coat layers 112, 112 and 212, 212 are formed on the front and back surfaces of base material layers 111 and 211 respectively. It is preferable that the base material layers 111 and 211 be formed of a highly transparent material. Specific examples of preferable materials include polyethylene terephthalate (PET), polyethylene naphthalate (PEN), polyether sulfone (PES), polyether ether ketone (PEEK), polycarbonate (PC), polypropylene (PP), polyamide (PA), polyacrylic acid (PAC), epoxy resins, phenol resins, aliphatic cyclic polyolefins, transparent norbornene-based thermoplastic resins and like flexible films; laminates of two or more such resins; glass plates; etc. The thickness of the base material layers 111 and 211 is preferably about 20 to 500 µm, and the thickness of the hard-coat layers 112 and 212 is preferably about 3 to 5 µm. In order to increase the rigidity, a support may be attached to the base material layers 111 and 211.

The undercoat layers 13 and 23 are formed from a laminate of two or more layers having different light refractive indices, wherein the layer having a lower refractive index is formed on the side of the transparent conductive films 12 and 22 respectively in order to increase the transparency.

Examples of materials for the laminate of undercoat layers 13 and 23 include silicon oxide, titanium oxide, tin oxide, etc. Examples of preferable combinations include tin oxide/hafnium oxide, silicon oxide/tin oxide, zinc oxide/tin oxide, tin oxide/titanium oxide, etc. The undercoat layers 13 and 23 can be formed by sputtering, vacuum evaporation, electron beam evaporation, etc.

Examples of materials for the transparent conductive films 12 and 22 include indium tin oxide (ITO), zinc oxide, indium oxide, antimony-doped tin oxide, fluorine-doped tin oxide, aluminum-doped zinc oxide, potassium-doped zinc oxide, silicon-doped zinc oxide, zinc oxide/tin oxide, indium oxide/ tin oxide, zinc oxide/indium oxide/magnesium oxide and like metal oxides. These materials may be used in combination. Examples of methods for forming transparent conductive films 12 and 22 include sputtering, vacuum deposition, ion plating and like PVD methods; CVD methods; coating methods; printing methods; etc. The thickness of the transparent conductive films 12 and 22 is generally about 10 to 50 nm.

Figure 2:
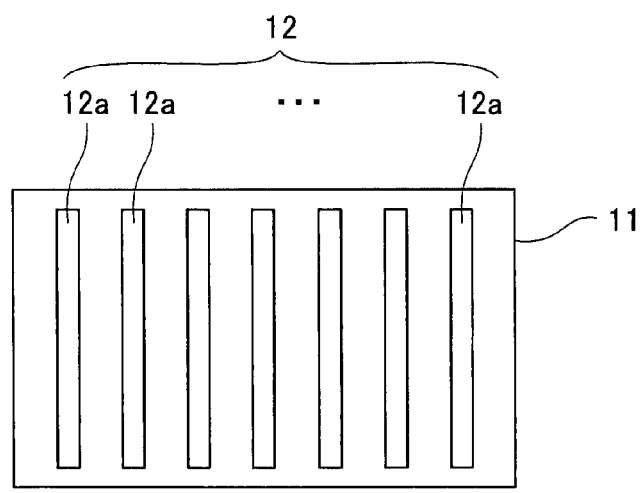
FIG. 2 is a plan view showing a part of the transparent touch switch of FIG. 1.
Figure 3:
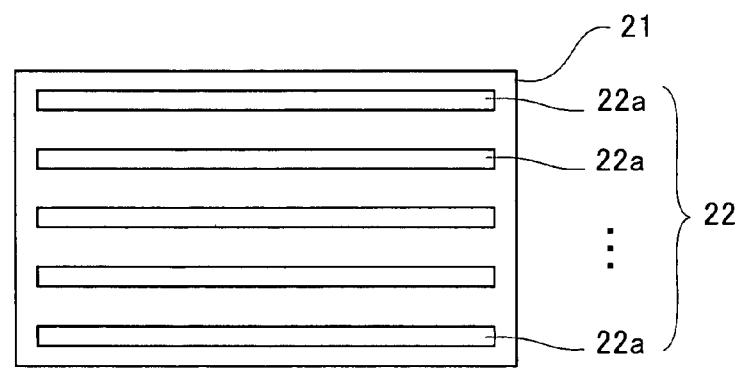
FIG. 3 is a plan view showing another part of the transparent touch switch of FIG. 1.
Figure 4:
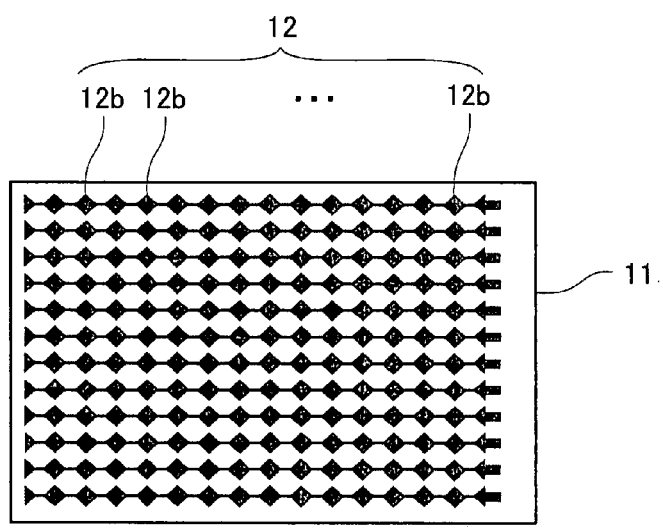
FIG. 4 is a plan view showing a modification example of the transparent touch switch of FIG. 1.
Figure 5:
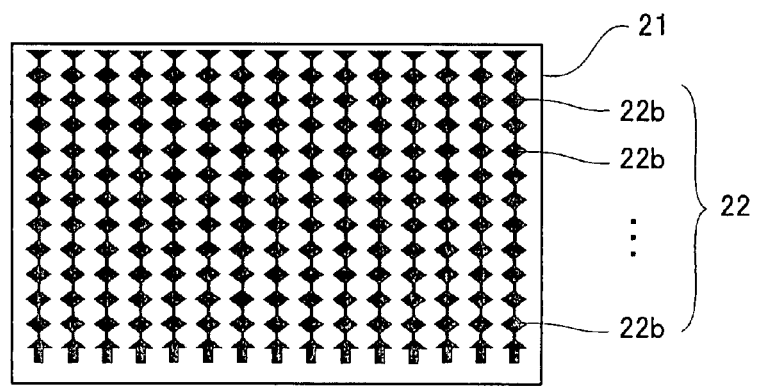
FIG. 5 is a plan view showing another modification example of the transparent touch switch of FIG. 1.

Each of the transparent conductive films 12 and 22 is formed, as shown in FIGS. 2 and 3, as an assembly of plurality of belt-like conductive members 12a and 22a extending in parallel. The belt-like conductive members 12a and 22a of the transparent conductive films 12 and 22 are disposed so as to perpendicularly intersect each other. The transparent conductive films 12 and 22 are connected to an outside drive circuit (not shown) via a routed circuit (not shown) formed of conductive ink, etc. The pattern of the transparent conductive films 12 and 22 is not limited to that in the present embodiment, and various patterns may be employed as long as the point touched with a finger, etc., can be detected. For example, as shown in FIGS. 4 and 5, the transparent conductive films 12 and 22 may have a structure, wherein a plurality of diamond-shaped conductive members 12b and 22b are linearly connected, the directions in which the diamond-shaped conductive members 12b and 22b are connected in each of the transparent conductive films 12 and 22 intersect at right angles, and the diamond-shaped conductive members 12b and 22b do not overlap each other as seen in a plan view.

The patterning of the transparent conductive films 12 and 22 can be conducted in the following manner. First, a mask having a predetermined shape is formed on the surfaces of the transparent conductive films 12 and 22, those disposed on the transparent substrates 11 and 21 via the undercoat layers 13 and 23 respectively. Second, the exposed portions are removed by etching using an acid liquid, etc., and the mask is then dissolved using an alkaline liquid, etc. By employing a method wherein the transparent conductive films 12 and 22 are patterned into a predetermined shape by etching, unnecessary transparent conductive films 12 and 22 can be removed while retaining the entire undercoat layers 13 and 23. However, the patterning method is not limited to this and other known methods may be employed. The undercoat layers 13 and 23 may be removed together with the unnecessary transparent conductive films 12 and 22.

The first transparent planar body 1 and the second transparent planar body 2 in the transparent touch switch of the present embodiment comprise overcoat layers 14 and 24 on the opposing surfaces (the surfaces on which transparent conductive films 12 and 22 are formed). The preferable materials for the overcoat layers 14 and 24 include silicon oxide, titanium oxide, tin oxide, etc. A particularly preferable material is silicon-tin oxide. The thickness of the overcoat layers 14 and 24 is generally about 10 to 500 nm and the refractive index is generally about 1.3 to 2.3.

It is preferable that the overcoat layer 14 in the first transparent planar body 1 be thicker than the transparent conductive film 12 and have a refractive index smaller than that of the transparent conductive film 12. This is also true for the overcoat layer 24 of the second transparent planar body 2. In other words, it is preferable that the overcoat layer 24 have a thickness greater than that of the transparent conductive film 22 and a refractive index smaller than that of the transparent conductive film 22. The refractive index of the overcoat layer 14 can be suitably controlled by, for example, if the overcoat layer is formed of a silicon-tin oxide, changing the ratio between silicon and tin. By selecting the thickness and the refractive index of the overcoat layers 14 and 24 as described above, the shapes of the transmission and reflection spectra from the first transparent planar body 1 and the second transparent planar body 2 can be equalized in the portions where the transparent conductive films 12 and 22 are formed and not formed, so that the difference in tones (light to dark) can be reduced. As a result, patterns of the transparent conductive films 12 and 22 in the first transparent planar body 1 and the second transparent planar body 2 become inconspicuous, improving visibility.

Specifically, as the overcoat layers 14 and 24 become thicker, the shape of the transmission spectrum (or the reflection spectrum) in the portions without transparent conductive films 12 and 22 gradually equalizes to that in the portions where the transparent conductive films 12 and 22 are provided. Therefore, by suitably selecting the thickness of the overcoat layers 14 and 24 so that the shapes of the spectra become substantially coincident in both portions, i.e., with and without the transparent conductive films 12 and 22, excellent visibility can be attained. For example, if the overcoat layers 14 and 24 are formed of a silicon-tin oxide (having a refractive index of about 1.7), it is preferable that the overcoat layers 14 and 24 have a thickness of 70 to 80 nm as shown in the Experimental Examples described later.

As described above, it is preferable that the refractive index of the overcoat layers 14 and 24 be smaller than that of the transparent conductive films 12 and 22. However, if the difference in the refractive index is too small, satisfactory effects from the overcoat layers 14 and 24 cannot be achieved. In contrast, if the difference in the refractive index is too large, reflections on the interface become unduly large and transmittance tends to be decreased. In view of such characteristics, the difference in the refractive index is preferably 0.03 to 0.4, and more preferably 0.1 to 0.3.

Examples of methods for forming the overcoat layers 14 and 24 include sputtering, vacuum evaporation, electron beam evaporation and like dry coating methods. Such method makes it possible to form the overcoat layers 14 and 24 having a uniform thickness on the exposed surfaces of the undercoat layers 13 and 23 and the surfaces of the transparent conductive films 12 and 22 of the first transparent planar body 1 and the second transparent planar body 2.

Attachment between the first transparent planar body 1 and the second transparent planar body 2 is preferably conducted in such a manner that an adhesive layer 15 lies between the entire attached surfaces so as to prevent formation of an air layer. Epoxy-based, acryl-based and like generally used transparent adhesives may be used as the adhesive layer 15, and they may include a core material formed from a transparent film of norbornene-based resin. The thickness of the adhesive layer 15 is generally 25 to 75 μm, and the refractive index is generally 1.4 to 1.6.

It is preferable that the refractive index of the adhesive layer 15 be smaller than that of the overcoat layers 14 and 24. Such arrangement makes the refractive indices of the transparent conductive film 12 (or 22), the overcoat layer 14 (or 24) and the adhesive layer 15 gradually become smaller in this order (i.e., in the order in which they are laminated. This makes it possible to equalize the shapes of the transmission spectrum and reflection spectrum in the entire transparent touch switch between the portions the transparent conductive films 12 and 22 are provided and not provided, reducing the difference in tones (light to dark). This makes the patterns of the transparent conductive films 12 and 22 in the first transparent planar body 1 and the second transparent planar body 2 inconspicuous and improves visibility.

In the transparent touch switch having the above structure, the method for detecting the touched position is the same as that in known electrostatic capacitive touch switches. Specifically, when the front surface of the first transparent planar body 1 is touched with a finger at any point, the transparent conductive films 12 and 22 are grounded through the electric capacity of a human body in the touched position. By detecting the current value which flows through the transparent electric conduction films 12 and 22 at this time, the coordinate of the touched position can be calculated. It is preferable that the surface resistance value of the overcoat layers 14 and 24 be large enough to obtain satisfactory insulation properties as an electrostatic capacitive touch switch, for example, not less than $1 \times 10^{12}$ ($\omega/\square$).

In the transparent touch switch 101 of the first embodiment, a linear polarizing plate may be provided on the front side (that is opposite to the surface on which the transparent conductive film 12 is formed) of the first transparent planar body 1. When a linear polarizing plate is provided, the transparent substrates 11 and 21 should be formed of an optical isotropic material. One example of a linear polarizing plate is an oriented film of polyvinyl alcohol (PVA) to which iodine, dichromatic dye or like dichromatic coloring matter is adsorbed and oriented. The linear polarizing plate may be formed by attaching a triacetyl acetate (TAC) film that functions as a protective film in such a manner that the thus-obtained oriented film is sandwiched between the triacetyl acetate (TAC) films. Optical isotropic materials are those that have no polarization to any incidental light, for example, polycarbonate (PC), polyether sulfone (PES), polyacrylic acid (PAC), amorphous polyolefin resin, cyclic polyolefin resins, aliphatic cyclic polyolefins, norbornene thermoplastic transparent resins, glass materials, etc. Examples of the methods for forming the transparent substrates 11 and 21 using these materials include casting and extrusion.

Such an arrangement can reduce the amount of reflected light attributable to the visible light incident in the touch switch by half or less compared to the case when a linear polarizing plate is not provided. This arrangement also makes the transparent conductive films 12 and 22 more inconspicuous and improves visibility of the touch switch.

It is also possible to provide a circular polarization component by fully attaching a linear polarizing plate with a quarter-wave plate, and fully attaching the quarter-wave plate to the touch switch 101 on the opposite surface (i.e., the back surface of the second transparent planar body 2). The quarter-wave plate may be formed by extending a film formed of polyvinyl alcohol (PVA), polycarbonate (PC), norbornene thermoplastic resin, cyclic polyolefin resin or the like to impart multiple flexibilities. It is preferable that the linear polarizing plate be fully attached to the quarter-wave plate having an adhesive layer formed of the materials usable for the adhesive layer 15 in between in such a manner that the formation of an air layer is prevented. Likewise, it is also preferable that the quarter-wave plate be attached to the second transparent planar body on the back side with an adhesive layer formed of the materials usable for the adhesive layer 15 lying in between so as to prevent formation of an air layer. In this case, it is preferable that the quarter-wave plates be arranged in such a manner that the optical axis of one quarter-wave plate perpendicularly intersects with the axis of the other quarter-wave plate.

By forming a circular polarization component in the manner as described above, it is possible to circularly polarize the reflected light and reduce internal reflection from the touch switch in the portion sandwiched between two quarter-wave plates, obtaining satisfactory low reflection properties. This arrangement also makes the transparent conductive films 12 and 22 more inconspicuous and improves visibility. It is also possible to form the transparent substrates 11 and 21 from a quarter-wave plate and laminate a linear polarizing plate thereon.

EXAMPLES

The present invention is explained below based on Examples and Comparative Examples, but the scope of the invention is not limited to these Examples.

Example

Figure 6:
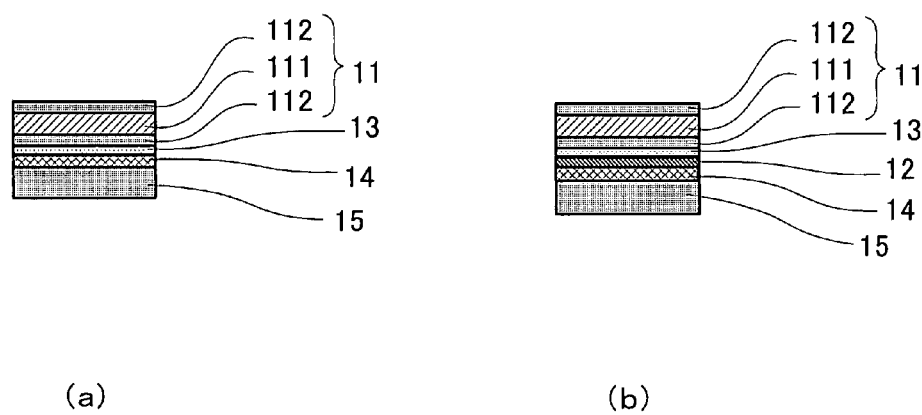
FIGS. 6(*a*) and 6(*b*) are cross-sectional views schematically showing the structures of the measurement samples used in the Examples of the present invention.

Two measurement samples (5 cm×7 cm) as shown in FIGS. 6(*a*) and 6(*b*) were prepared to evaluate the difference in transmittance between the portions where a transparent conductive film 12 was provided and not provided in a transparent touch switch having the structure shown in FIG. 1. Sample A shown in FIG. 6(*a*) was a laminate wherein a transparent substrate 11, an undercoat layer 13, an overcoat layer 14, and an adhesive layer 15 are laminated in this order without providing a transparent conductive film. The transparent substrate 11 was formed in such a manner that two hard-coat layers 112 and 112 having a thickness of 3 to 5 μm was formed on the front and back surfaces of a base material layer 111 formed from a 200 μm thick PET film. The undercoat layer 13 was formed in such a manner that a silicon oxide layer having a thickness of 30 nm and a silicon-tin oxide layer having a thickness of 70 nm were layered on the transparent substrate 11 in this order. The overcoat layer 14, which had a refractive index of 1.7, was obtained by sputtering a silicon-tin oxide so as to have a thickness of 70 nm. The adhesive layer 15 was formed from an acrylic adhesive (P043FP product of Lintec Corporation) so as to have a thickness of 20 to 30 μm.

Sample B shown in FIG. 6(*b*) was formed in such a manner that a transparent conductive film 12 having a thickness of 30 nm formed of ITO was provided between the undercoat layer 13 and the overcoat layer 14 of Sample A shown in FIG. 6(*a*). The transparent conductive film 12 had a refractive index of 1.95.

Transmission spectra of Samples A and B were measured from the front surface of the transparent substrate 11. A spectrophotometer (U-3310, product of Hitachi, Ltd.) was used for the measurement of spectral transmittance. As shown in FIG. 7(*a*), transmission spectra of Samples A and B were similar in both portions.

In the transparent touch switch of FIG. 1, the thickness of the overcoat layer 14 was set at 70 nm as described above, and irradiation was conducted using a 24 W three band fluorescent lamp while varying the irradiation angle. The shape of the electric conduction pattern was barely observed, and satisfactory results were obtained.

Subsequently, an Experimental Example similar to the above was conducted with setting the thickness of the overcoat layer 14 of Samples A and B to 80 nm. As shown in FIG. 7(*b*), the transmission spectra were slightly different at high wavelengths, but substantially the same at low wavelengths. The difference in transmittance was small around the wavelength of 550 nm, which greatly affects the visibility. Also in this case, the results of visible observation of the touch switch were excellent.

Comparative Example

Figure 8:
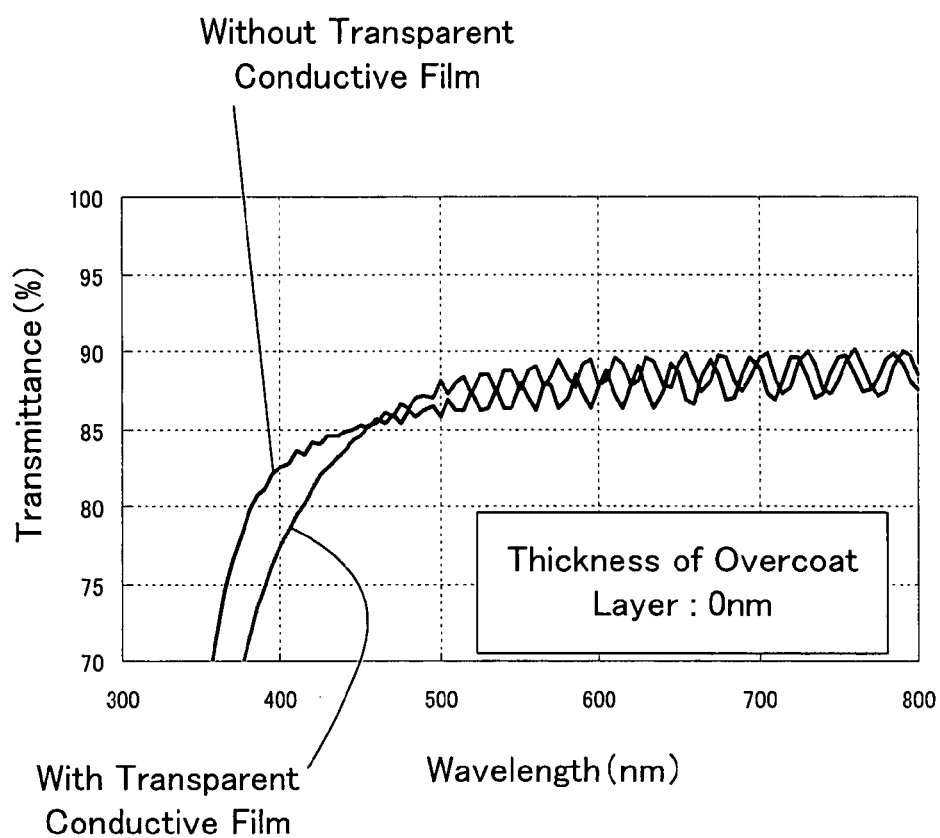
FIG. 8 illustrates the transmission spectra of a Comparative Example.

As a Comparative Example to the above Example, Samples C and D were prepared in such a manner that the overcoat layer 14 was not provided in the structures of Samples A and B shown in FIGS. 6(*a*) and 6(*b*). The transmission spectra of Samples C and D were measured in the same manner as in the Example described above. As shown in FIG. 8, there was a large difference in the shapes of the transmission spectra especially at low wavelengths.

The results of visual observation of the touch switch were that Sample D provided with a transparent conductive film had a purplish color tone compared to Sample C without a transparent conductive film. The difference between the presence and absence of the transparent conductive film was clearly observed as a difference in the color tone of reflected light.

Second Embodiment

The second embodiment of the present invention is explained below with reference to the attached drawings. To make the structure easier to understand, each component in the attached drawings is partially expanded or reduced and thus not shown to actual scale.

Figure 9:
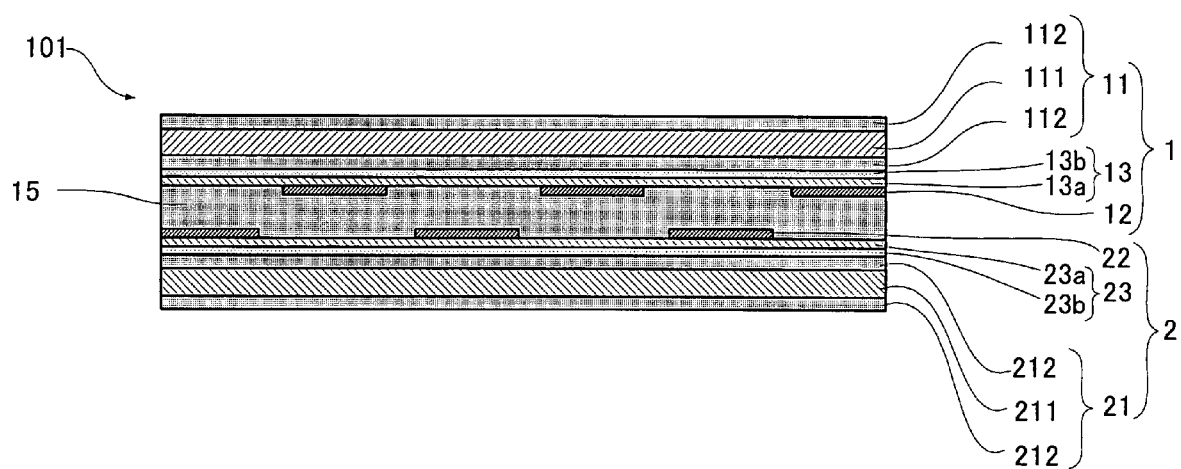
FIG. 9 is a schematic cross-sectional view showing the structure of the transparent touch switch according to the second embodiment of the present invention.

FIG. 9 is a schematic cross-sectional view showing the transparent touch switch according to the second embodiment of the present invention. The transparent touch switch 101 is an electrostatic capacitive touch switch, which comprises a first transparent planar body 1 formed by providing a transparent conductive film 12 on a transparent substrate 11 via an undercoat layer 13; and a second transparent planar body 2 formed by providing a transparent conductive film 22 on a transparent substrate 21 via an undercoat layer 23. The first transparent planar body 1 and the second transparent planar body 2 are attached to each other via the adhesive layer 15 in such a manner that the transparent conductive films 12 and 22 face each other.

The transparent substrates 11 and 21 are formed by providing hard-coat layers 112, 112 and 212, 212 on the front and back surfaces of the base material layers 111 and 211. It is preferable that the base material layers 111 and 211 be formed of a highly transparent material. Specific examples include polyethylene terephthalate (PET), polyethylene naphthalate (PEN), polyether sulfone (PES), polyether ether ketone (PEEK), polycarbonate (PC), polypropylene (PP), polyamide (PA), polyacrylic acid (PAC), epoxy resins, phenol resins, aliphatic cyclic polyolefins, norbornene thermoplastic transparent resins, siloxane crosslinked acrylic silicone resins and like flexible films; laminates of two or more of these materials; glass plates; etc. It is preferable that the thickness of the base material layers 111 and 211 be about 20 to 500 μm, and the thickness of the hard-coat layers 112 and 212 be about 3 to 5 μm. In order to impart the rigidity to the base material layers 111 and 211, a support may be provided.

In order to enhance the durability and the adhesion of the undercoat layers 13 and 23, it is preferable that the hard-coat layers 112 and 212 be provided on the front and back surfaces of the base material layers 111 and 211. However, it is also possible to form the transparent substrates 11 and 21 by providing the hard-coat layers 112 and 212 only on one surface of the base material layers 111 and 211 or without providing the hard-coat layers 112 and 212.

The undercoat layers 13 and 23 are formed from laminates of low refractive index layers 13a and 23a and high refractive index layers 13b and 23b having a higher light refractive index than the low refractive index layers 13a and 23a. The transparent conductive films 12 and 22 are formed on the low refractive index layers 13a and 23a side so as to improve transparency.

Examples of the materials for the layers that form laminates for the undercoat layers 13 and 23 include silicon oxide, titanium oxide, tin oxide, etc. Examples of preferable combinations for the laminates include tin oxide/hafnium oxide, silicon oxide/tin oxide, zinc oxide/tin oxide, tin oxide/titanium oxide, etc. From the viewpoint of visibility, a particularly preferable combination is that the low refractive index layers 13a and 23a be formed of silicon oxide ($SiO_n$, n=1.7 to 2.0) and the high refractive index layers 13b and 23b be formed of silicon-tin oxide. The undercoat layers 13 and 23 can be formed by sputtering, vacuum evaporation, electron beam evaporation, etc.

According to the simulation results obtained by the present inventors described later, it is preferable that the high refractive index layers 13b and 23b be thinner than the low refractive index layers 13a and 23a. Such arrangement can make the shapes of the patterns of the transparent conductive films 12 and 22 formed on the surfaces of the undercoat layers 13 and 23 inconspicuous and improve visibility of the touch switch. It is preferable that the thickness of the high refractive index layers 13b and 23b be 10 to 25 nm. In this case, it is preferable that the thickness of the low refractive index layers 13a and 23a be 25 to 45 nm.

Examples of the materials for the transparent conductive films 12 and 22 include indium tin oxide (ITO), zinc oxide, indium oxide, antimony-doped tin oxide, fluorine-doped tin oxide, aluminum-doped zinc oxide, potassium-doped zinc oxide, silicon-doped zinc oxide, zinc oxide/tin oxide, indium oxide/tin oxide, zinc oxide/indium oxide/magnesium oxide and like metal oxides. These materials may be used in combination. The transparent conductive films 12 and 22 can be formed by sputtering, vacuum deposition, ion plating and like PVD methods; CVD methods; coating methods; printing methods; etc.

The transparent conductive films 12 and 22 are formed, as in the first embodiment, as an assembly of a plurality of belt-like conductive members 12a and 22a respectively, extending in parallel as shown in FIGS. 2 and 3. The belt-like conductive members 12a and 22a of the transparent conductive films 12 and 22 are disposed so as to perpendicularly intersect to each other. The transparent conductive films 12 and 22 are connected to an outside drive circuit (not shown) via a routed circuit (not shown) formed of conductive ink, etc. The pattern of the transparent conductive films 12 and 22 is not limited to that in the present embodiment, and various patterns may be employed as long as the position touched with a finger, etc., can be detected. For example, as shown in FIGS. 4 and 5, the transparent conductive films 12 and 22 may have the following structure. A plurality of diamond-shaped conductive members 12b and 22b are linearly connected, wherein the connection directions of the diamond-shaped conductive members 12b and 22b in the transparent conductive films 12 and 22 intersect at right angles, and the diamond-shaped conductive members 12b and 22b do not overlap each other as seen in a plan view.

Patterning of the transparent conductive films 12 and 22 can be conducted in the following manner. First, a mask having a predetermined shape is formed on the surface of the transparent conductive films 12 and 22 those disposed on the transparent substrates 11 and 21 via the undercoat layers 13 and 23. Second, the exposed portions are removed by etching using an acid liquid, etc., and then the mask is resolved using an alkaline liquid, etc. By employing the method wherein the transparent conductive films 12 and 22 are patterned into a predetermined shape by etching, unnecessary transparent conductive films 12 and 22 can be removed while retaining the entire undercoat layers 13 and 23. However, the pattering method is not limited to this and other known methods may be employed.

The thickness of the transparent conductive films 12 and 22 be generally about 10 to 50 nm. In order to make the shapes of the patterns of the transparent conductive films 12 and 22 inconspicuous and improve visibility, it is preferable that the transparent conductive films 12 and 22 be made as thin as possible. However, if the transparent conductive films 12 and 22 are too thin, it becomes difficult to obtain excellent crystallizability and satisfactory durability and weathering resistance of the film, and therefore the preferable thickness is about 10 to 25 nm.

Attachment between the first transparent planar body 1 and the second transparent planar body 2 is preferably conducted in such a manner that an adhesive layer 15 lies on the entire attached surfaces so as to prevent formation of an air layer. The adhesive layer 15 may be formed of epoxy-based, acryl-based and like generally used transparent adhesives, and may include a core material formed from a transparent film of norbornene-based resin. The adhesive layer 15 generally has a thickness of 25 to 75 μm, and a refractive index of 1.4 to 1.6.

Figure 10:
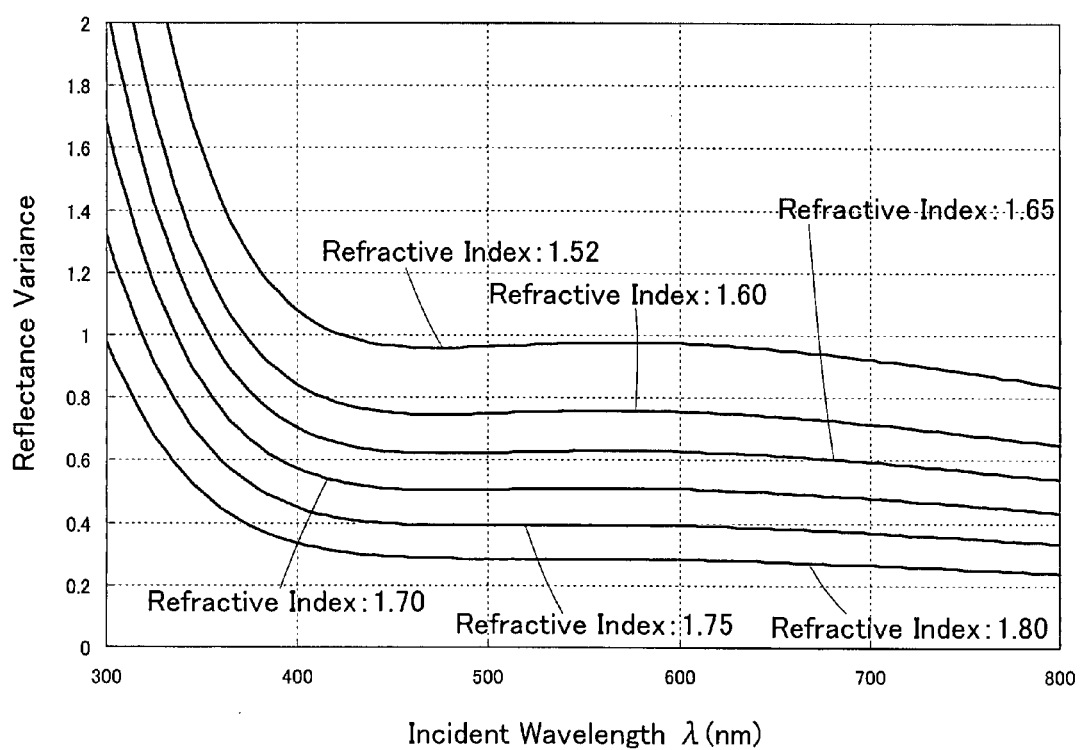
FIG. 10 shows the simulation results of the changes in the reflectance variance between when a transparent electric conduction film is provided and not provided with the assumption that the thickness of a transparent electric conduction film is 30 nm.

According to the simulation results obtained by the present inventors described later, by suitably selecting the refractive index of the adhesive layer 15, the visibility of the transparent touch switch 101 can be further improved. The simulation was conducted on the basis of the assumptions below. The transparent substrates 11 and 21 are formed by providing a hard-coat layer (thickness: 5 μm, refractive index: 1.52) on the front and back surfaces of a base material layer (thickness: 188 μm, refractive index: 1.65) formed from a PET film. In the undercoat layers 13 and 23, a high refractive index layer is formed from a silicon-tin oxide film (thickness: 25 nm, refractive index: 1.7) and a low refractive index layer is formed from a silicon oxide film (thickness: 30 nm, refractive index: 1.43). The transparent conductive films 12 and 22 are formed from an ITO film (thickness: 30 nm, refractive index: 1.95). The thickness of the adhesive layer 15 is 25 μm, and the refractive index of the adhesive layer 15 is varied as a parameter. The difference in the reflectance (%) between the portions where the transparent conductive films 12 and 22 are formed and the portions where the transparent conductive films 12 and 22 are not formed (i.e., the portions where the cover layers 16 and 26 are formed) was calculated based on the simulation. The reflectance was calculated using a thin film designing software (Optas-Film available from Cybernet Systems Co., Ltd.). FIG. 10 shows the absolute values of the differences in reflectance (%) obtained using this simulation. In this simulation, calculation of reflectance was conducted assuming the thicknesses of the transparent substrates 11 and 21, the adhesive layer 15, etc., which are very large compared to the thickness of the undercoat layers 13 and 23, the transparent conductive films 12 and 22 and like components having a nano-order thickness, to be ∞ (infinite).

The inconspicuousness of the pattern shapes of the transparent conductive films 12 and 22 is correlated to the degree of the difference in reflectance between the portions where the transparent conductive films 12 and 22 are formed and not formed. The smaller the absolute value of the reflectance difference in the visible region as a whole (wavelength: about 400 to 800 nm), the more the pattern shape becomes inconspicuous and the better visibility can be obtained. As shown in FIG. 10, the absolute values of the reflectance difference becomes smaller as the refractive index of the adhesive layer 15 becomes greater. Therefore, making the refractive index of the adhesive layer 15 greater is preferable from the viewpoint of visibility.

Figure 11:
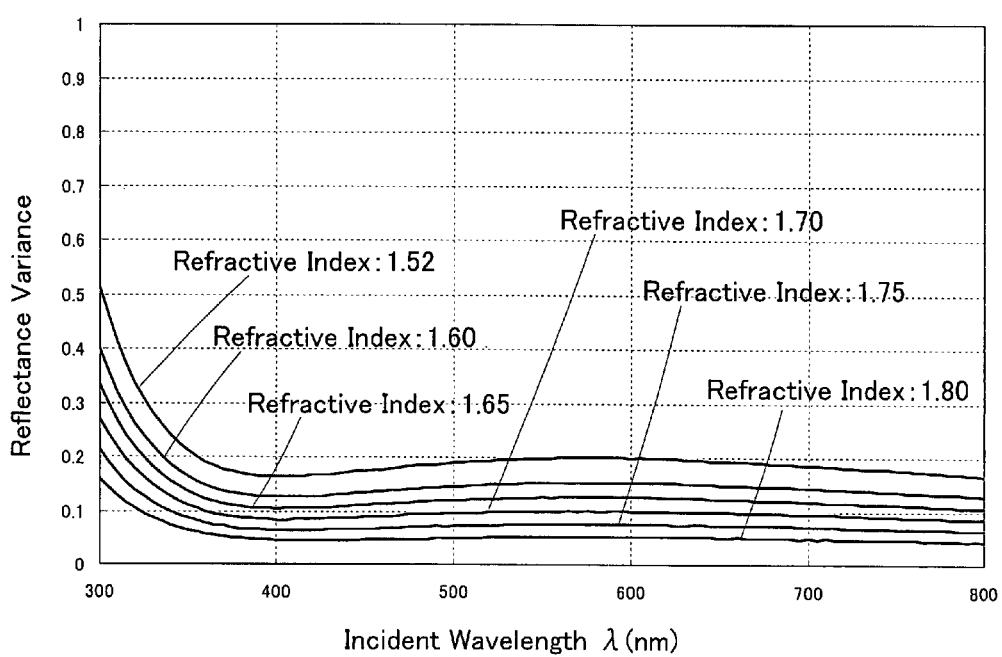
FIG. 11 shows the simulation results of the changes in the reflectance variance between when a transparent electric conduction film is provided and not provided with the assumption that the thickness of a transparent electric conduction film is 15 nm.
Figure 12:
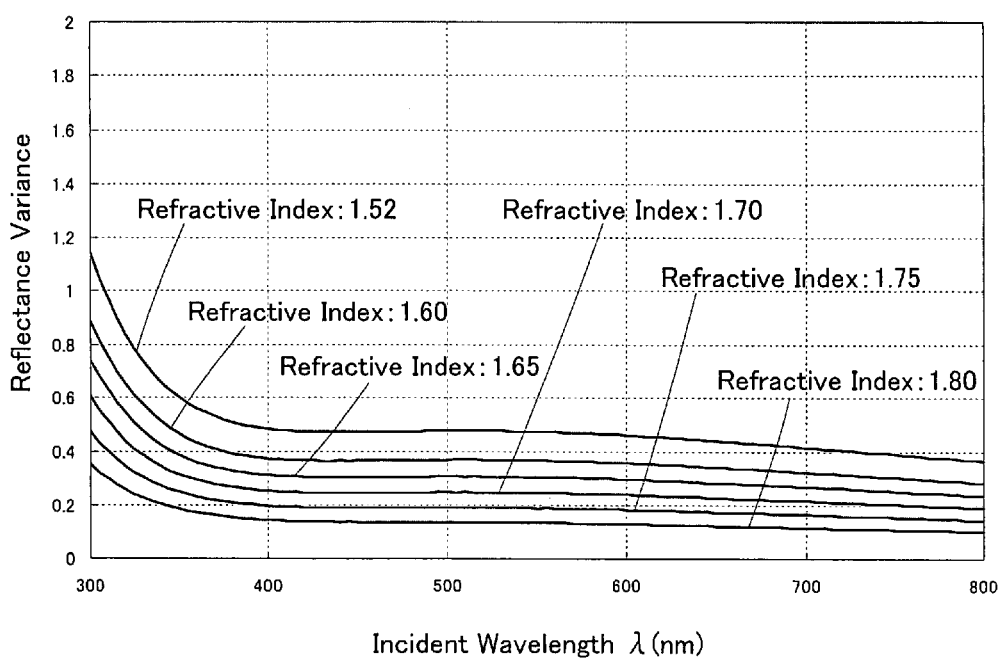
FIG. 12 shows the simulation results of the changes in the reflectance variance between when a transparent electric conduction film is provided and not provided with the assumption that the thickness of a transparent electric conduction film is 20 nm.
Figure 13:
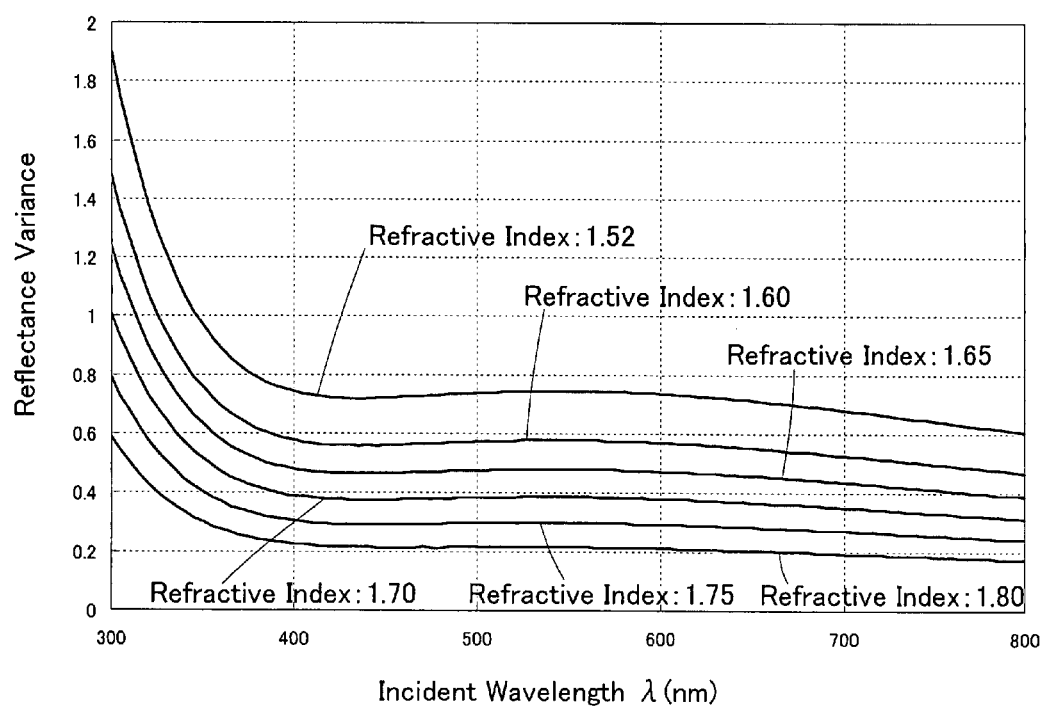
FIG. 13 shows the simulation results of the changes in the reflectance variance between when a transparent electric conduction film is provided and not provided with the assumption that the thickness of a transparent electric conduction film is 25 nm.

Assuming the thickness of the transparent conductive films 12 and 22 to be 15 nm, 20 nm and 25 nm, the difference in the reflectance (%) between the portions where the transparent conductive films 12 and 22 are formed and not formed (i.e., the portions where the cover layers 16 and 26 are formed) were simulated while varying the refractive index of the adhesive layer 15 as a parameter. FIGS. 11 to 13 show the simulation results. Note that FIG. 11 shows the results when the thickness of the transparent conductive films 12 and 22 is 15 nm, FIG. 12 shows the results when the thickness is 20 nm, and FIG. 13 shows the results when the thickness is 25 nm.

Table 1 shows the absolute values of the reflectance difference extracted from the simulation results shown in FIGS. 10 to 13 at specific refractive indices of adhesive layer 15 with the input light wavelength of 550 nm.

TABLE 1

| Refractive Indices of Adhesive Layer 15 | Thickness of Transparent Conductive Film | | | |
|---|---|---|---|---|
| | 15 nm | 20 nm | 25 nm | 30 nm |
| 1.52 | 0.20 | 0.48 | 0.74 | 0.98 |
| 1.60 | 0.15 | 0.37 | 0.58 | 0.76 |
| 1.65 | 0.13 | 0.31 | 0.48 | 0.63 |
| 1.70 | 0.10 | 0.24 | 0.39 | 0.51 |
| 1.75 | 0.07 | 0.19 | 0.30 | 0.39 |
| 1.80 | 0.05 | 0.13 | 0.21 | 0.29 |

As is clear from FIGS. 11 to 13 and Table 1, as the same as the simulation results made on the assumption that the thickness of the transparent conductive films 12 and 22 is 30 nm, the absolute values of the reflectance difference becomes smaller as the refractive index of the adhesive layer 15 becomes greater when the thickness of the transparent conductive films 12 and 22 is set at 15 nm, 20 nm or 25 nm. Therefore, making the refractive index of the adhesive layer 15 greater is preferable from the viewpoint of visibility.

As is clear from Table 1, when the thickness of the transparent conductive films 12 and 22 falls within the range of 20 to 25 nm, the absolute value of the reflectance difference can be made less than about 0.5 by using an adhesive layer 15 having a refractive index of not less than 1.6. Therefore, by setting the thickness of the transparent conductive films 12 and 22 within the range of 20 to 25 nm and using an adhesive layer 15 having a refractive index of not less than 1.6 in the transparent touch switch 101 having the structure as shown in FIG. 9, a transparent touch switch 101 having excellent visibility wherein the pattern shapes of the transparent conductive films 12 and 22 are inconspicuous can be obtained.

It is also clear from the data shown in Table 1, when the thickness of the transparent conductive films 12 and 22 falls within the range of 25 to 30 nm, which is preferable from the viewpoint of durability, by using an adhesive layer 15 having a refractive index of not less than 1.7, the absolute value of reflectance difference can be reduced to less than about 0.5. Therefore, in the transparent touch switch 101 having the structure as shown in FIG. 9, by setting the thickness of the transparent conductive films 12 and 22 to 25 to 30 nm and using an adhesive layer 15 having a refractive index of not smaller than 1.7, it is possible to obtain a transparent touch switch 101 in which the pattern shapes of the transparent conductive films 12 and 22 are inconspicuous while keeping the excellent durability of the transparent conductive films 12 and 22, and obtaining excellent visibility.

In the transparent touch switch having the above structure, the method for detecting the touched position is the same as that in known electrostatic capacitive touch switches. Specifically, the front surface of the first transparent planar body 1 is touched with a finger, etc., at any point, the transparent conductive films 12 and 22 are grounded through the electric capacity of a human body in the touched position. By detecting the current value which flows through the transparent electric conduction films 12 and 22 at this time, the coordinate of the touched position can be calculated.

In the transparent touch switch 101 of the second embodiment, a linear polarizing plate may be provided on the front side (the surface opposite to that on which the transparent conductive film 12 is formed) of the first transparent planar body 1. When the linear polarizing plate is provided, the transparent substrates 11 and 21 should be formed of an optical isotropic material. Examples of the usable materials for the linear polarizing plate include polyvinyl alcohol (PVA) oriented films in which iodine, dichroic dye or like dichroic coloring matter is adsorbed and oriented. The linear polarizing plate may be formed by attaching a triacetyl acetate (TAC) film that functions as a protective film in such a manner that the thus-obtained oriented film is sandwiched between the triacetyl acetate (TAC) films. Optical isotropic materials are those that do not show polarizing characteristics to any incidental light, such as polycarbonate (PC), polyether sulfone (PES), polyacrylic acid (PAC), amorphous polyolefin resins, cyclic polyolefin resins, aliphatic cyclic polyolefins, norbornene thermoplastic transparent resins, glass materials, etc. The transparent substrates 11 and 21 can be formed by casting or extruding these materials.

This structure can reduce the amount of reflected light attributable to visible light entering the touch switch to about less than half of that when the polarizing plate is not provided. Furthermore, this arrangement makes the transparent conductive films 12 and 22 more inconspicuous and improves visibility.

It is also possible to provide a circular polarization component by fully attaching a linear polarizing plate with a quarter-wave plate, and fully attaching the quarter-wave plate with the touch switch 101 on the opposite surface (i.e., the back surface of the second transparent planar body 2). The quarter-wave plate may be formed by extending a film formed of polyvinyl alcohol (PVA), polycarbonate (PC), norbornene thermoplastic resin, cyclic polyolefin resin or the like to impart multiple flexibilities. It is preferable that the linear polarizing plate be fully attached with the quarter-wave plate having an adhesive layer formed of the materials usable for the adhesive layer 15 in between, in such a manner that the formation of an air layer is prevented. Likewise, it is also preferable that the quarter-wave plate be attached to the second transparent planar body on the back side with an adhesive layer formed of the materials usable for the adhesive layer 15 lying in between so as to prevent formation of an air layer. In this case, it is preferable that the quarter-wave plates be arranged in such a manner that the optical axis of one quarter-wave plate perpendicularly intersects with the axis of the other quarter-wave plate.

By forming a circular polarization component in the manner as described above, it is possible to circularly polarize reflected light and reduce the internal reflection of the touch switch in the portion sandwiched between two quarter-wave plates, obtaining satisfactory low reflection properties. This arrangement also makes the transparent conductive films 12 and 22 more inconspicuous and improves visibility. It is also possible to form the transparent substrates 11 and 21 from a quarter-wave plate and a linear polarizing plate laminated thereon.

In the second embodiment, the present invention is applied to a transparent electrostatic capacitive touch switch wherein two transparent planar bodies are attached via an adhesive layer. However, it is also possible to employ the present invention to a matrix-type resistive film touch switch wherein two transparent planar bodies are attached via an air layer.

Example

The present invention is explained in detail below based on Examples. However, the present invention is not limited to these Examples.

Experimental Example 1

First, in order to determine the optimum thickness of the transparent conductive film in a structure wherein a transparent conductive film is formed directly on a transparent substrate without providing an undercoat layer, the difference in reflectance (%) between the portion where the transparent conductive film is formed and the portion where the transparent conductive film is not formed was obtained by simulation.

Figure 14:
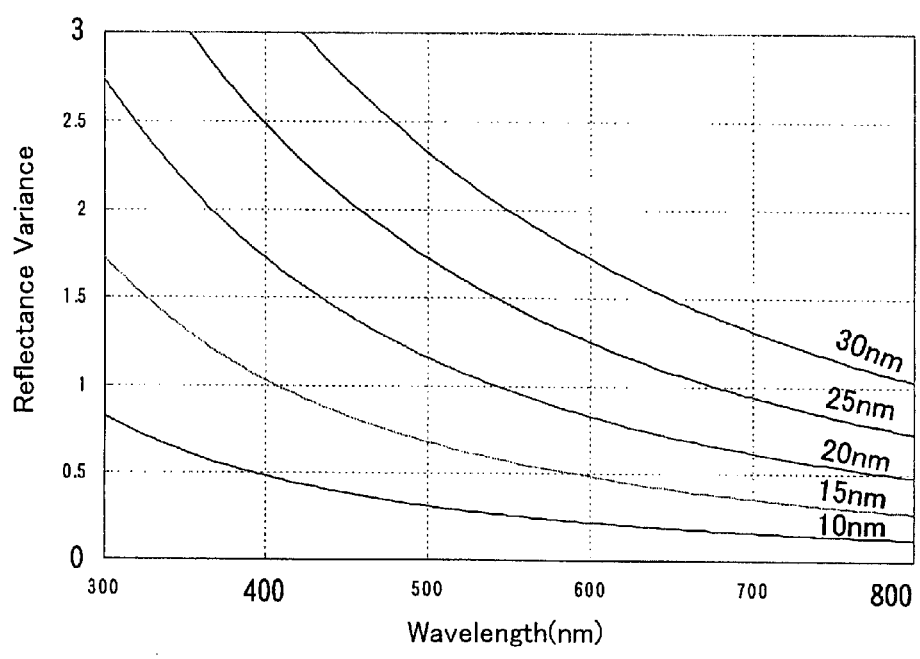
FIG. 14 shows the simulation results of the changes in the reflectance variance between when a transparent electric conduction film is provided and not provided.

The transparent substrate is obtained by providing a hard-coat layer (thickness: 5 μm, refractive index: 1.52) on the front and back surfaces of a base material layer (thickness: 188 μm, refractive index: 1.65) that is formed from a PET film. The transparent conductive film is formed from an ITO film (refractive index: 1.95). On the transparent conductive film side of the transparent substrate, an adhesive layer (thickness: 25 μm, refractive index: 1.52) formed of an acrylic resin was formed. The reflectance was calculated using a thin film designing software (Optas-Film available from Cybernet Systems Co., Ltd.). In this calculation, absorption in the PET layer, etc., was disregarded. FIG. 14 shows the reflectance (%) differences obtained by using the thickness of the transparent conductive film as a parameter in this structure.

The inconspicuousness of the pattern shape of the transparent conductive film is correlative to the reflectance difference between the portions where the transparent conductive film is formed and not formed. The smaller the absolute value of the reflectance difference in the visible region as a whole (wavelength: about 400 to 800 nm), the more the pattern shape becomes inconspicuous and the better visibility that can be obtained. As shown in FIG. 14, the absolute values of the reflectance difference becomes smaller as the transparent conductive film becomes thinner, and therefore making the transparent conductive film thinner is preferable from the viewpoint of visibility. However, in order to increase the crystallizability, durability and weathering resistance of the transparent conductive film, a certain thickness is necessary, and therefore the thickness of the transparent conductive film is preferably 10 to 25 nm, and the optimally about 15 nm.

Experimental Example 2

The optimum thicknesses of a low refractive index layer and a high refractive index layer forming the undercoat layer in the structure (shown in FIG. 9) wherein an undercoat layer is formed between a transparent substrate and a transparent conductive film were determined. The thickness and refractive index of the transparent substrate and the refractive index of the transparent conductive film were assumed to be the same as those in Experimental Example 1, and the thickness of the transparent conductive film was determined to be 15 nm based on the results of Experimental Example 1. An adhesive layer was formed on the front side of the transparent conductive film, wherein the thickness and refractive index of the adhesive layer were also made to be the same as those in Experimental Example 1. The undercoat layer was formed as a laminate of a low refractive index layer formed of silicon oxide having a refractive index of 1.43 and a high refractive index layer formed of a silicon-tin oxide having a refractive index of 1.7.

Figure 15:
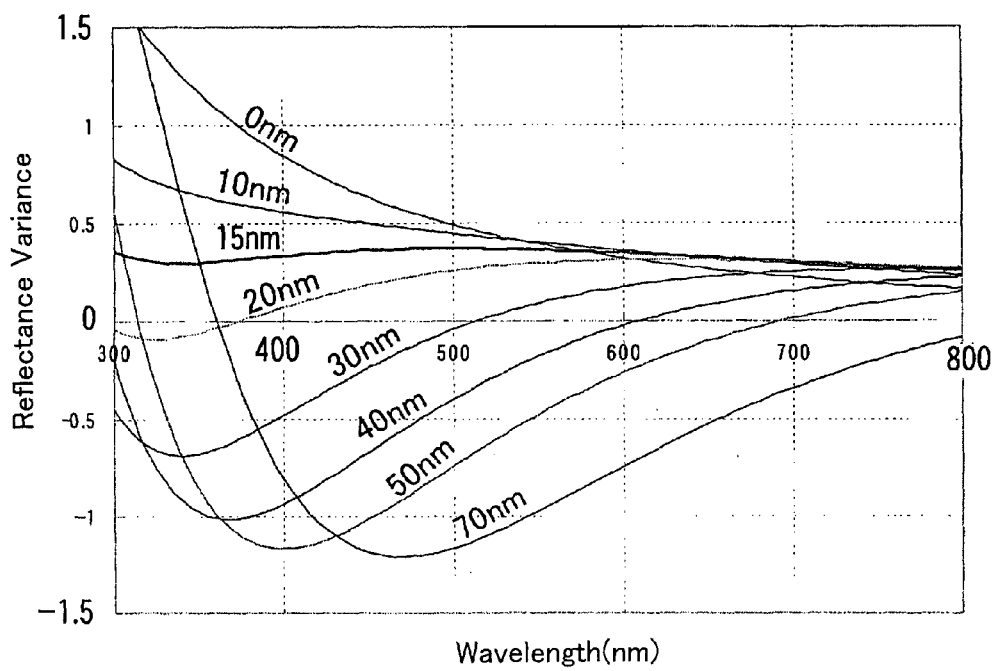
FIG. 15 shows the results of another simulation of the changes in the reflectance variance between when a transparent electric conduction film is provided and not provided.

In this structure, the thickness of the low refractive index layer was set at 30 nm, the thickness of the high refractive index layer was varied as a parameter, and then the reflectance difference between the portions where the transparent conductive film is formed and not formed was obtained by simulation. FIG. 15 shows the results.

As shown in FIG. 15, when the thickness of the high refractive index layer was 0 (i.e., the high refractive index layer was not present), the absolute values and rate of change of reflectance difference in the low-wave length side (about 400 to 500 nm) of the visible region became greater, and this made it difficult to obtain excellent visibility. In contrast, when the thickness of the high refractive index layer was 10 to 20 nm, the absolute values and rate of change of the reflectance difference were small in the entire visible region, and excellent visibility was obtained. When the thickness of the high refractive index layer became larger than 30 nm, which was the thickness of the low refractive index layer, the absolute values and rate of change of the reflectance difference tended to increase again and this tended to reduce visibility.

Figure 16:
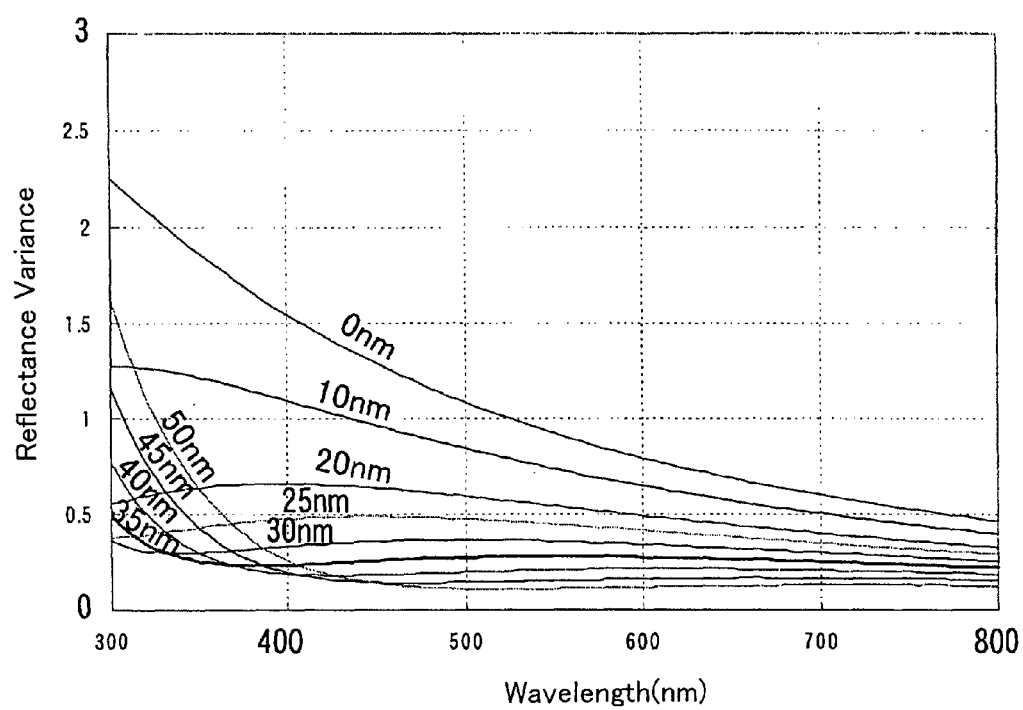
FIG. 16 shows the results of a further simulation of the changes in the reflectance variance between when a transparent electric conduction film is provided and not provided.

Subsequently, the reflectance difference between the portions where the transparent conductive film is formed and not formed was obtained by simulation with the assumptions of the thickness of the high refractive index layer being 15 nm, and the thickness of the low refractive index layer being varied as a parameter. FIG. 16 shows the results.

As shown in FIG. 16, when the thickness of the low refractive index layer was 0 (i.e., the low refractive index layer was not present), the absolute values and rate of change of reflectance difference in the low-wave length side (about 400 to 500 nm) of the visible region became greater, and this made it difficult to obtain excellent visibility. In contrast, as the low refractive index layer became thicker, the absolute values and rate of change of the reflectance difference tended to become smaller. When the low refractive index layer became thicker than 15 nm, i.e., thicker than the high refractive index layer, both the absolute values and rate of change of the reflectance difference became satisfactorily small, obtaining excellent visibility. When the thickness of the low refractive index layer reached 50 nm, the absolute value of the reflectance difference was small but the rate of change of the reflectance difference on the low-wave length side of the visible region became greater. This gradually decreased visibility.

Based on these simulation results, it became clear that the thickness of the high refractive index layer in the undercoat layer is preferably smaller than that of the low refractive index layer. More specifically, the thickness of the high refractive index layer is preferably 10 to 25 nm and, in this case, the thickness of the low refractive index layer is preferably 25 to 45 nm.

Based on these simulation results, a trial model of the transparent planar body having a high refractive index layer thickness of 15 nm, and a low refractive index layer thickness of 35 nm was made. The resultant transparent planar body achieved excellent visibility without suffering from visible pattern shapes of the conductive layer, and therefore the validity of the above simulation results was confirmed.

Experimental Example 3

Figure 17:
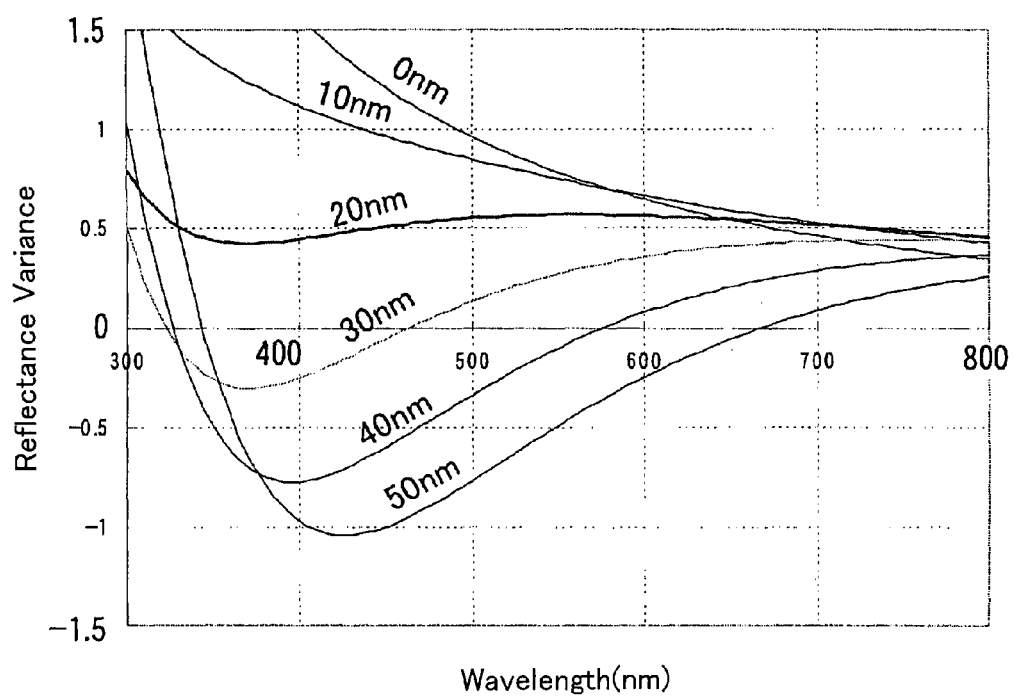
FIG. 17 shows the results of a further simulation of the changes in the reflectance variance between when a transparent electric conduction film is provided and not provided.

The preferred thicknesses of the low refractive index layer and the high refractive index layer in the undercoat layer obtained in Experimental Example 2 have almost the same tendency even when the thickness of layers other than the undercoat layer changes. For example, even when the transparent conductive film in Experimental Example 2 becomes thicker, there is almost no change in the ranges of the preferred thickness of the low refractive index layer and the high refractive index layer, but visibility remarkably decreases when the thicknesses do not fall within these preferred ranges. FIG. 17 shows the reflectance differences when the thickness of the transparent conductive film was changed from 15 to 20 nm in the structure of Experimental Example 2 (the thickness of the low refractive index layer: 30 nm) with using the thickness of the high refractive index layer as a parameter.

In a structure wherein one or both hard-coat layers are not provided on the front and back surfaces of the base material layer of the transparent substrate, the ranges of the preferred thickness of the high refractive index layer and the low refractive index layer in the undercoat layer tend to be widened compared to that of Experimental Example 2. A certain degree of visibility can be obtained even when an undercoat layer is formed from only a low refractive index layer without providing a high refractive index layer.

Third Embodiment

The third embodiment of the present invention is explained below with reference to the attached drawings. To make the structure easier to understand, each component in the attached drawings is partially expanded or reduced and thus not shown to actual scale.

Figure 18:
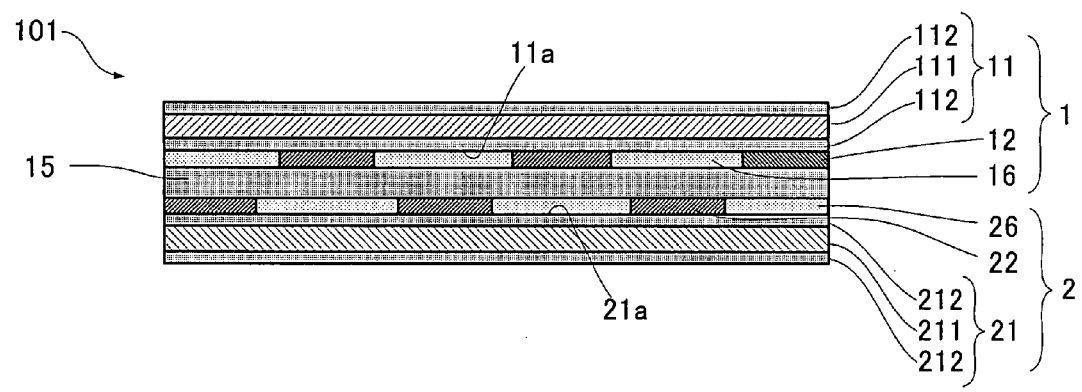
FIG. 18 is a schematic cross-sectional view showing the structure of the transparent touch switch according to the third embodiment of the present invention.

FIG. 18 is a schematic cross-sectional view illustrating the transparent touch switch according to the third embodiment of the present invention. This transparent touch switch 101 is an electrostatic capacitive touch switch comprising a first transparent planar body 1 having a patterned transparent conductive film 12 formed on one surface of a transparent substrate 11, and a second transparent planar body 2 having a patterned transparent conductive film 22 formed on one surface of a transparent substrate 21. The first transparent planar body 1 and the second transparent planar body 2 are attached to each other via an adhesive layer 15 in such a manner that the transparent conductive films 12 and 22 face each other.

The transparent substrates 11 and 21 are structured so that hard-coat layers 112, 112 and 212, 212 are formed on the front and back surfaces of base material layers 111 and 211 respectively. It is preferable that the base material layers 111 and 211 be formed of a highly transparent material. Specific examples of preferable materials include polyethylene terephthalate (PET), polyethylene naphthalate (PEN), polyether sulfone (PES), polyether ether ketone (PEEK), polycarbonate (PC), polypropylene (PP), polyamide (PA), polyacrylic acid (PAC), epoxy resins, phenol resins, aliphatic cyclic polyolefins, transparent norbornene-based thermoplastic resins and like flexible films; laminates of two or more such resins; glass plates; etc. The thickness of the base material layers 111 and 211 is preferably about 20 to 500 µm, and the thickness of the hard-coat layers 112 and 212 is preferably about 3 to 5 µm. In order to increase the rigidity, a support may be attached to the base material layers 111 and 211.

Examples of materials for the transparent conductive films 12 and 22 include indium tin oxide (ITO), indium oxide, antimony-doped tin oxide, fluorine-doped tin oxide, aluminum-doped zinc oxide, potassium-doped zinc oxide, silicon-doped zinc oxide, zinc oxide/tin oxide, indium oxide/tin oxide, zinc oxide/indium oxide/magnesium oxide, zinc oxide and like metal oxides. These materials may be used alone or in combination.

It is also possible to use composite materials wherein carbon nanotubes, carbon nanohorns, carbon nanowires, carbon nanofibers, graphite fibril and like superthin electric conduction carbon fibers are disposed in a polymer material, which functions as a binder, as materials for the transparent conductive films 12 and 22. Examples of usable polymer materials include polyaniline, polypyrrole, polyacetylene, polythiophene, polyphenylene vinylene, polyphenylene sulfide, poly(p-phenylene), poly(heterocyclic vinylene), poly(3,4-ethylenedioxythiophene) (PEDOT) and like conductive polymers. It is also possible to use non-conductive polymers such as polyethylene terephthalate (PET), polyethylene naphthalate (PEN), polyether sulfone (PES), polyether ether ketone (PEEK), polycarbonate (PC), polypropylene (PP), polyamide (PA), polyacrylic acid (PAC), polyimide, epoxy resins, phenol resins, aliphatic cyclic polyolefins, norbornene thermoplastic transparent resins and like non-conductive polymers.

In particular, when a carbon nanotube composite material obtained by dispersing carbon nanotubes in a non-conductive polymer material is used as a material for the transparent conductive films 12 and 22, because carbon nanotubes are extremely thin with a diameter of generally about 0.8 to 1.4 nm (i.e., around 1 nm), by dispersing the carbon nanotube in the non-conductive polymer material one-by-one or one-bundle-by-one-bundle, blockage of light transmittance due to the carbon nanotubes can be reduced. This is preferable so as to reliably obtain transparency of the transparent conductive films 12 and 22.

Examples of the methods for forming the transparent conductive films 12 and 22 include sputtering, vacuum deposition, ion plating and like PVD methods; CVD methods; coating methods; printing methods; etc. The thickness of the transparent conductive films 12 and 22 is generally about 10 to 50 nm.

Each of the transparent conductive films 12 and 22 is formed, as shown in FIGS. 2 and 3, as an assembly of pluralities of belt-like conductive members 12a and 22a extending in parallel. The belt-like conductive members 12a and 22a of the transparent conductive films 12 and 22 are disposed so as to perpendicularly intersect to each other. The transparent conductive films 12 and 22 are connected to an outside drive circuit (not shown) via a routed circuit (not shown) formed of conductive ink, etc. The pattern of the transparent conductive films 12 and 22 is not limited to that in the present embodiment, and various patterns may be employed as long as the point touched with a finger, etc., can be detected. For example, as shown in FIGS. 4 and 5, the transparent conductive films 12 and 22 may have a structure, wherein a plurality of diamond-shaped conductive members 12b and 22b are linearly connected, the directions in which the diamond-shaped conductive members 12b and 22b are connected in each of the transparent conductive films 12 and 22 intersect at right angles, and the diamond-shaped conductive members 12b and 22b do not overlap each other as seen in a plan view.

Patterning of the transparent conductive films 12 and 22 can be conducted by forming a mask having a predetermined shape on the surface of the transparent conductive films 12 and 22 formed on the transparent substrates 11 and 21, removing the exposed portions by etching using an acid liquid, etc., and then dissolving the mask using an alkaline liquid, etc. However, the patterning method is not limited to this and any known method may be employed.

On one surface of the transparent substrates 11 and 21 (the surface on which the transparent conductive films 12 and 22 are formed) of the first transparent planar body 1 and the second transparent planar body 2 of the transparent touch switch according to the third embodiment, in the exposed portions 11a and 21a where the transparent conductive films 12 and 22 are not formed, cover layers 16 and 26 are formed so as to cover the exposed portions 11a and 21a. The cover layers 16 and 26 are formed so that the surfaces thereof become substantially flush with the surfaces of the transparent conductive films 12 and 22. Examples of the materials for the cover layers 16 and 26 include silicon-tin oxide, silicon oxide, titanium oxide, tin oxide, cerium oxide, niobium pentoxide, tantalum pentoxide, zirconium oxide; zirconium oxide/silicon oxide, zirconium oxide/tin oxide, zirconium oxide/titanium dioxide and like composite oxides; etc. In particular, silicon-tin oxide is preferable.

The refractive index of the cover layers 16 and 26 is equivalent to that of the transparent conductive films 12 and 22 and can be suitably controlled by, for example, if the cover layers are formed of a silicon-tin oxide, changing the ratio between silicon and tin. Here, the "refractive index of the cover layers 16 and 26 is equivalent to that of the transparent conductive films 12 and 22" means not only that the refractive index of the cover layers 16 and 26 is completely coincident with that of the transparent conductive films 12 and 22, but also includes the case when there is a difference in the refractive index between the cover layers 16 and 26 and the transparent conductive films 12 and 22 to such an extent that the pattern shape of the transparent conductive films 12 and 22 can be made inconspicuous. Specifically, the absolute values of the difference in the refractive indices between the cover layers 16 and 26 and the transparent conductive films 12 and 22 is preferably not more than 0.08, and more preferably not more than 0.03.

If a carbon nanotube composite material is selected as a material for the transparent conductive films 12 and 22, because the refractive index of the carbon nanotube composite material is lower than that of indium tin oxide (ITO), i.e., the refractive index of a carbon nanotube composite material is about 1.6 and the refractive index of an indium tin oxide is about 1.9 to 2.0, selection of the materials for the cover layers 16 and 26 having a refractive index equivalent to that of the transparent conductive films 12 and 22 becomes easy.

By selecting the shape and the refractive index of the cover layers 16 and 26 as described above, it is possible to make the shape of the transmission spectrum and reflection spectrum of the first transparent planar body 1 and the second transparent planar body 2 substantially the same in the portions where the transparent conductive films 12 and 22 are formed and not formed, reducing the difference in tones (light to dark). As a result, in the first transparent planar body 1 and the second transparent planar body 2, the pattern shape in the transparent conductive films 12 and 22 can be made inconspicuous, and visibility can be improved.

Examples of the methods for forming the cover layers 16 and 26 include sputtering, vacuum evaporation, electron beam evaporation and like dry coating methods. A specific method for forming the cover layers 16 and 26 using such dry coating method is explained below. First, as shown in FIG. 19(a), a mask 50 having a desirable pattern shape is formed on the surface of the transparent substrate 11 (21) of the transparent conductive film 12 (22). Second, the exposed portion 51 of the transparent conductive film 12 (22) on which the mask 50 is not formed is removed by etching to form exposed portion 11a (21a) (FIG. 19(b)). Third, the material for the cover layer is applied to the exposed portion 11a (21a) and on top of the mask 50 by a dry coating method. At this time, the thickness of the cover layer formed on the exposed portion 11a (21a) is made substantially the same as that of the transparent conductive film 12 (22) (FIG. 19(c)). Subsequently, by removing the mask 50, the cover layer 16 (26) that is substantially flush with the transparent conductive film 12 (22) can be formed on the exposed portion 11a (21a) (FIG. 19(d)). After coating the transparent conductive films 12 and 22 and exposed portions 11a and 21a with a material for the cover layer by screen printing, photogravure printing, bar coating, spin coating, die coating, spray coating or like wet coating method in such a manner that the transparent conductive films 12 and 22 and the exposed portions 11a and 21a are completely covered, etching is conducted so as to make the surface of the cover layers 16 and 26 on the first transparent planar body 1 and the second transparent planar body 2 flush with the surface of the transparent conductive films 12 and 22.

Attachment between the first transparent planar body 1 and the second transparent planar body 2 is preferably conducted in such a manner that an adhesive layer 15 lies on the entire attachment surface so that formation of an air layer can be prevented. The adhesive layer 15 may be formed of epoxy-based, acryl-based and like generally used transparent adhesives, and may include a core material formed from a transparent film of norbornene-based resin. The thickness of the adhesive layer 15 is generally 25 to 100 μm.

In the transparent touch switch having the above structure, the method for detecting the touched position is the same as that in known electrostatic capacitive touch switches. Specifically, the front surface of the first transparent planar body 1 is touched with a finger or the like at any point, the transparent conductive films 12 and 22 are grounded through the electric capacity of a human body in the touched position. By detecting the current value which flows through the transparent electric conduction films 12 and 22 at this time, the coordinate of the touched position can be calculated. It is preferable that the surface resistance value of the overcoat layers 14 and 24 be large enough to obtain satisfactory insulation properties as an electrostatic capacitive touch switch, for example, not less than $1 \times 10^{12}$ (ω/□).

Figure 20:
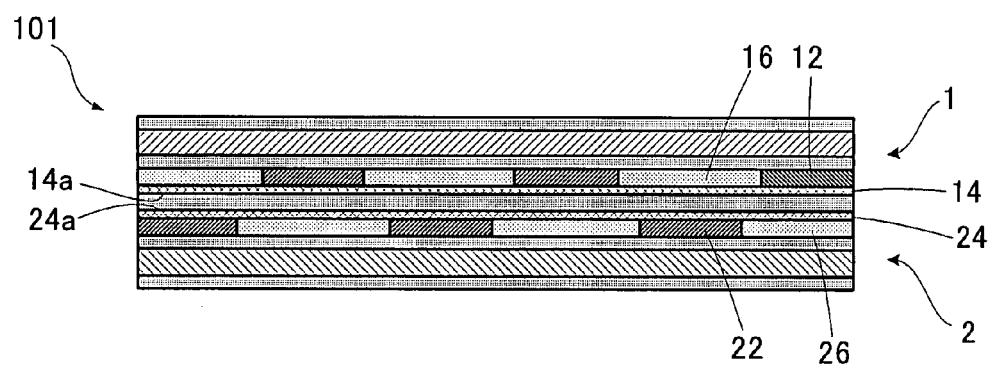
FIG. 20 is a schematic cross-sectional view illustrating a modification example of the transparent touch switch of FIG. 18.

The third embodiment of the present invention is explained in the above; however, the specific structure of the present invention is not limited to the third embodiment. For example, as shown in FIG. 20, in the first transparent planar body 1 and the second transparent planar body 2, the overcoat layers 14 and 24 may be provided to cover the surfaces of the transparent conductive films 12 and 22 and the cover layers 16 and 26. The overcoat layers 14 and 24 are formed so as to have entirely flat surfaces 14a and 24a. By employing such a structure, while keeping the pattern shape of the transparent conductive films 12 and 22 inconspicuous, it is possible to protect the transparent conductive films 12 and 22 of the first transparent planar body 1 and the second transparent planar body 2. It is preferable that the surface resistance value of the overcoat layers 14 and 24 be large enough to obtain satisfactory insulating properties so that it can properly operate as an electrostatic capacitive touch switch, for example, not less than $1 \times 10^{12}$ (ω/□).

Examples of the methods for forming the overcoat layers 14 and 24 include sputtering, vacuum evaporation, electron beam evaporation and like dry coating methods; and screen printing, photogravure printing, barcoating, spin coating, die coating, spray coating and like wet coating methods.

When a material for the overcoat layers 14 and 24 is the same as, for example, that for the cover layers 16 and 26, it is possible to simultaneously form the cover layers 16 and 26 and the overcoat layers 14 and 24 by screen printing, etc. This allows the formation of the transparent planar bodies 1 and 2 in an efficient manner. It is also possible to form the overcoat layers 14 and 24 using a material different from that of the cover layers 16 and 26.

Figure 21:
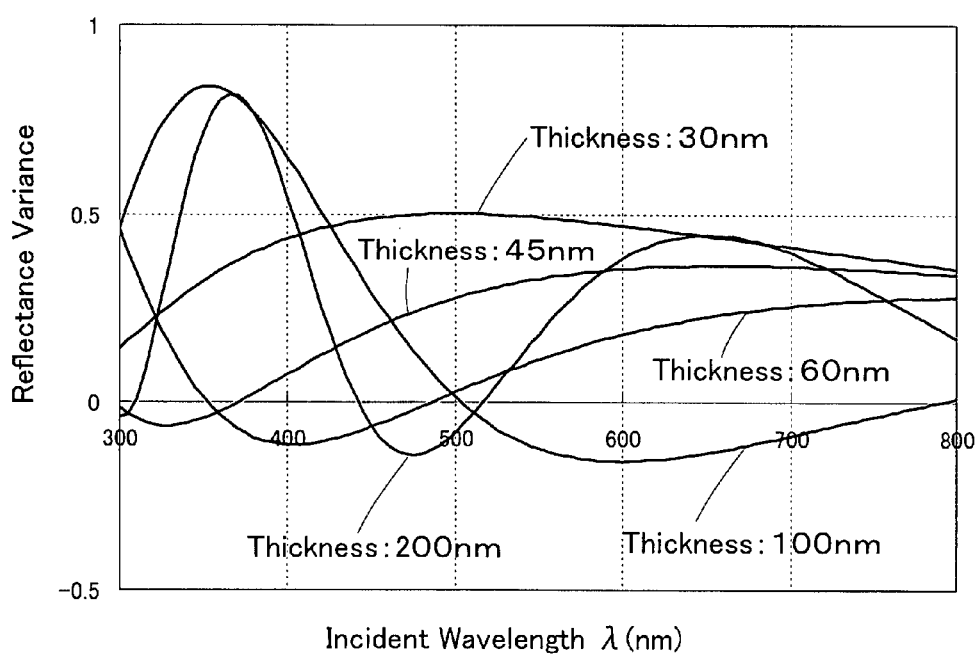
FIG. 21 shows the simulation results of the changes in the reflectance variance between when a transparent electric conduction film is provided and not provided.
Figure 22:
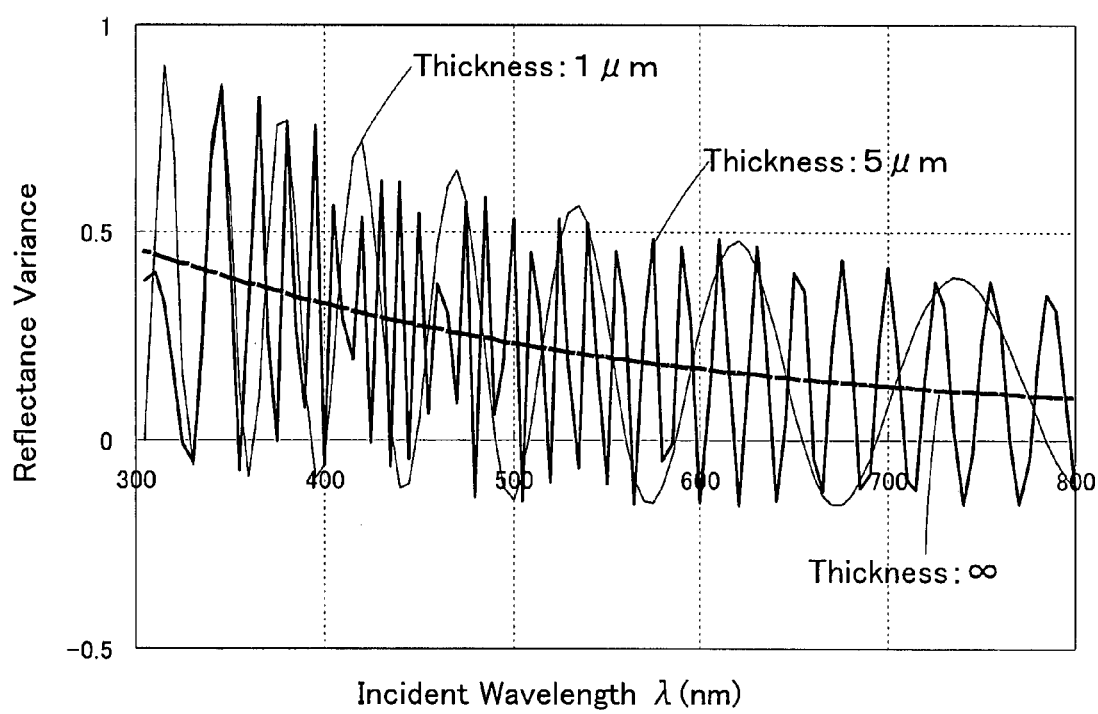
FIG. 22 shows the simulation results of the changes in the reflectance variance between when a transparent electric conduction film is provided and not provided.

According to the results of the simulation conducted by the present inventors, the thickness of the overcoat layers 14 and 24 is preferably from about 10 nm, which is the minimum film thickness feasible in the case of sputtered thin film, to about 30 nm, or not less than 1 μm. The details of the simulation are explained below. The transparent substrates 11 and 21 were obtained by forming a hard-coat layer (having a thickness of 5 μm and refractive index of 1.52) on the front and back surfaces of the base material layer (thickness: 188 μm, refractive index: 1.65) formed of a PET film. The transparent conductive films 12 and 22 were formed from an ITO film (thickness: 30 nm, refractive index: 1.95). The cover layers 16 and 26 were formed of a silicon-tin oxide (thickness: 30 nm, refractive index: 1.95). The adhesive layer 15 was formed of an acrylic resin (thickness: 25 μm, refractive index: 1.52). The refractive index of the overcoat layers was 1.9 and the thickness of the overcoat layers was varied as a parameter. The difference in the reflectance (%) between the portions where the transparent conductive films 12 and 22 are formed and portions where the transparent conductive films 12 and 22 are not formed (i.e., the portions where the cover layers 16 and 26 are formed) were simulated while varying this parameter. The reflectance was calculated using a thin film designing software (Optas-Film available from Cybernet Systems Co., Ltd.). FIGS. 21 and 22 show the differences of reflectance (%) obtained by this simulation. FIG. 21 shows the case when the thickness of the overcoat layers 14 and 24 was assumed as being of a nano order and FIG. 22 shows the case when the thickness thereof was assumed as being of a μm order.

The inconspicuousness of the pattern shape of the transparent conductive film is correlative to the reflectance difference between the portions where the transparent conductive film is formed and not formed. The smaller the absolute value of the reflectance difference in the visible region as a whole (wavelength: about 400 to 800 nm), the more the pattern shape becomes inconspicuous and the better visibility that can be obtained. Generally speaking, if the absolute value of the reflectance difference is smaller than about 0.5, the pattern shape becomes more inconspicuous. In FIG. 21, when the thickness of the overcoat layers 14 and 24 is not less than 45 nm, the rate of change of the reflectance difference is great and when the thickness is about 30 nm, the rate of change is small. As is clear form the results, it is preferable that the overcoat layers 14 and 24 be thinner than 30 nm so as to obtain excellent visibility.

In FIG. 22, which shows the results when the overcoat layers 14 and 24 have a nano-order thickness, when the thickness of the overcoat layers 14 and 24 is not less than 1 μm, the absolute value of the reflectance difference is as small as about 0.5, and preferable from the viewpoint of visibility.

In the present embodiment, the transparent electrostatic capacitive touch switch 101 has a structure wherein the first transparent planar body 1 and the second transparent planar body 2 are attached to each other via the adhesive layer 15 in such a manner that the transparent conductive films 12 and 22 face each other. However, it is also possible to obtain a transparent resistive film-type touch switch by arranging the first transparent planar body 1 and the second transparent planar body 2 in such a manner that the transparent conductive films 12 and 22 face each other having a predetermined space therebetween created by a spacer.

In the transparent touch switch having the above structure, the method for detecting the touched position is the same as that in known electrostatic capacitive touch switches. Specifically, the front surface of the first transparent planar body 1 is touched with a finger or the like at any point, the transparent conductive films 12 and 22 are grounded through the electric capacity of a human body in the touched position. By measuring the resistance at the touched point in a time-sharing manner in the vertical and horizontal directions, the coordinate of the touched position can be calculated.

Figure 23:
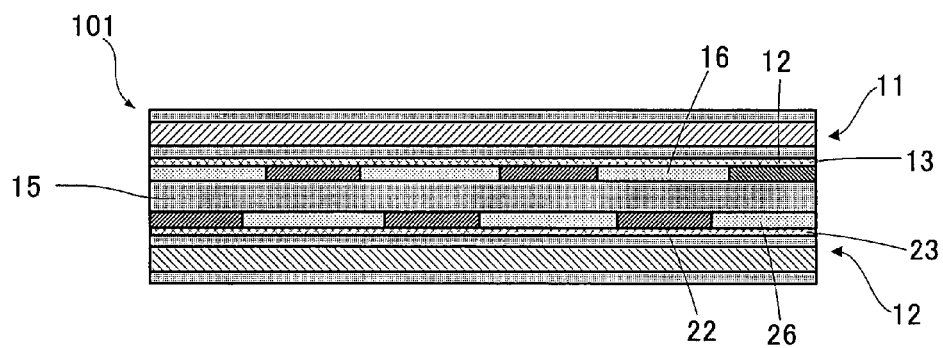
FIG. 23 is a schematic cross-sectional view illustrating a modification example of the transparent touch switch of FIG. 18.

As shown in FIG. 23, the transparent touch switch of the present embodiment may further comprise undercoat layers 13 and 23 formed from a laminate of a low refractive index layer and a high refractive index layer, whose light refractive index is higher than that of the low refractive index layer. The undercoat layers 13 and 23 lie between the transparent conductive films 12, 22 and the cover layers 16, 26, and the transparent substrates 11, 21, i.e., the undercoat layers are disposed below the transparent conductive films and the cover layers but over the transparent substrates, so that the transparent conductive films 12 and 22 and the cover layers 16 and 26 are formed on the low refractive index layer side. This structure improves the transparency of the transparent touch switch 101.

Examples of the materials for each layer of the laminate forming the undercoat layers 13 and 23 include silicon-tin oxide film, silicon oxide, titanium oxide, tin oxide, etc. Examples of preferable combinations include tin oxide/hafnium oxide, silicon oxide/tin oxide, zinc oxide/tin oxide, tin oxide/titanium oxide, etc. The undercoat layers 13 and 23 can be formed by sputtering, vacuum evaporation, electron beam evaporation, etc.

In the transparent touch switch 101 of the third embodiment, it is also possible to provide a linear polarizing plate on the front side of the first transparent planar body 1 (the surface opposite to the surface on which the transparent conductive film 12 is formed). When the linear polarizing plate is provided, it is necessary to form the transparent substrates 11 and 21 from an optical isotropic material. Examples of the materials for the linear polarizing plate include polyvinyl alcohol (PVA) oriented films in which iodine, dichroic dye or like dichroic coloring matter is adsorbed and oriented. It is also possible to attach a protective film of triacetyl acetate (TAC) on the surfaces of this film so as to hold it. Optical isotropic materials are those that do not show polarizing characteristics to any incidental light, such as polycarbonate (PC), polyether sulfone (PES), polyacrylic acid (PAC), amorphous polyolefin resins, cyclic polyolefin resins, aliphatic cyclic polyolefins, norbornene thermoplastic transparent resins, glass materials, etc. The transparent substrates 11 and 21 can be formed by casting or extruding these materials.

Such an arrangement can reduce the amount of reflected light attributable to visible light incident in the touch switch to about half compared to the case when the linear polarizing plate is not provided. This arrangement also makes the transparent conductive films 12 and 22 more inconspicuous and improves visibility.

It is also possible to provide a circular polarization component by fully attaching a linear polarizing plate with a quarter-wave plate, and fully attaching the quarter-wave plate with the touch switch 101 on the opposite surface (i.e., the back surface of the second transparent planar body 2). The quarter-wave plate may be formed by extending a film formed of polyvinyl alcohol (PVA), polycarbonate (PC), norbornene thermoplastic resin, cyclic polyolefin resin or the like to impart multiple flexibilities. It is preferable that the linear polarizing plate be fully attached, with the quarter-wave plate having an adhesive layer formed of the materials usable for the adhesive layer 15 in between in such a manner that the formation of an air layer is prevented. Likewise, it is also preferable that the quarter-wave plate be attached to the second transparent planar body on the back side, with an adhesive layer formed of the materials usable for the adhesive layer 15 lying in between, so as to prevent formation of an air layer. In this case, it is preferable that the quarter-wave plates be arranged in such a manner that the optical axis of one quarter-wave plate perpendicularly intersects with the axis of the other quarter-wave plate.

By forming a circular polarization component in the manner as described above, it is possible to circularly polarize the reflected light and reduce the internal reflection of the touch switch in the portion sandwiched between two quarter-wave plates, obtaining satisfactory low reflection properties. This arrangement also makes the transparent conductive films 12 and 22 more inconspicuous and improves visibility. It is also possible to form the transparent substrates 11 and 21 from a quarter-wave plate and a linear polarizing plate laminated thereon.

Fourth Embodiment

The fourth embodiment of the present invention is explained below with reference to the attached drawings. To make the structure easier to understand, each component in the attached drawings is partially expanded or reduced and thus not shown to actual scale.

Figure 24:
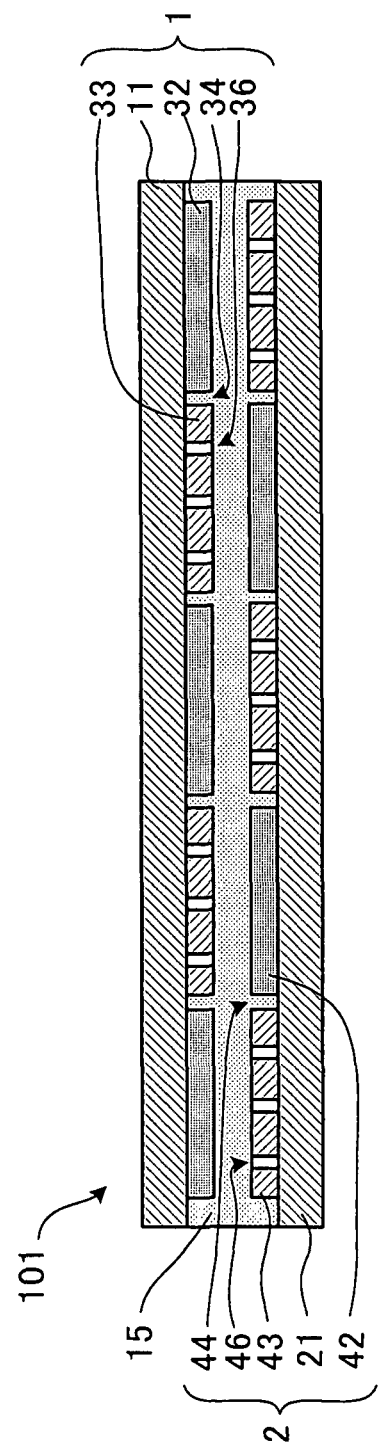
FIG. 24 is a schematic cross-sectional view showing the electrostatic capacitive touch switch according to the fourth embodiment of the present invention.

FIG. 24 is a schematic cross-sectional view illustrating the touch switch according to the fourth embodiment of the present invention. The transparent touch switch 101 is an electrostatic capacitive touch switch comprising a first transparent planar body 1 having a plurality of belt-like transparent conductive members 32 disposed on one surface of the transparent substrate 11 with a predetermined space therebetween, and a second transparent planar body 2 having a plurality of belt-like transparent conductive members 42 disposed on one surface of the transparent substrate 21 with a predetermined space therebetween. The first transparent planar body 1 and the second transparent planar body 2 are attached to each other via the adhesive layer 15 in such a manner that the belt-like transparent conductive members 32 and 42 face each other.

It is preferable that the transparent substrates 11 and 21 be formed of a highly transparent material. Specific examples of preferable materials include polyethylene terephthalate (PET), polyimide (PI), polyethylene naphthalate (PEN), polyether sulfone (PES), polyether ether ketone (PEEK), polycarbonate (PC), polypropylene (PP), polyamide (PA), polyacrylic acid (PAC), acrylic resins, amorphous polyolefin resins, cyclic polyolefin resins, aliphatic cyclic polyolefins, transparent norbornene-based thermoplastic resins and like flexible films; laminates of two or more such resins; soda-lime glass, alkali free glass, borosilicate glass, quartz glass and like glass plates; etc. The thickness of the transparent substrates 11 and 21 is preferably about 20 to 500 μm. If the surface of the touch switch is to be touched by a pen, finger or the like, a hardcoat processing may be conducted on one or both surfaces of the transparent substrates 11 and 21 to improve the transparency, resistance to scuffing, wear resistance, non-glare properties, etc.

When the transparent substrates 11 and 21 are formed of a flexible material, a support may be attached to the transparent substrates 11 and 21 to increase the rigidity thereof. Examples of the materials for the support include glass plates, and resin materials having a hardness similar to that of glass. The thickness of the support is preferably not less than 100 μm and more preferably 0.2 to 0.5 mm.

As described above, the first and second transparent planar bodies 1 and 2 comprise a plurality of belt-like transparent conductive members 32 and 42 formed on one surface of the transparent substrates 11 and 21 with a specific space therebetween. The first and second transparent planar bodies 1 and 2 further comprise belt-like transparent controlling members 33 and 43 formed of the same material as that of the belt-like transparent conductive members 32 and 42, disposed between each of the belt-like transparent conductive members 32 and 42 respectively. In the first and second transparent planar bodies 1 and 2, the belt-like transparent controlling members 33 and 43 formed of the same material as that of the belt-like transparent conductive members 32 and 42 are disposed between each belt-like transparent conductive members 32 and 42 respectively, the shape of the belt-like transparent conductive members 32 and 42 can be made inconspicuous, improving visibility.

Figure 25:
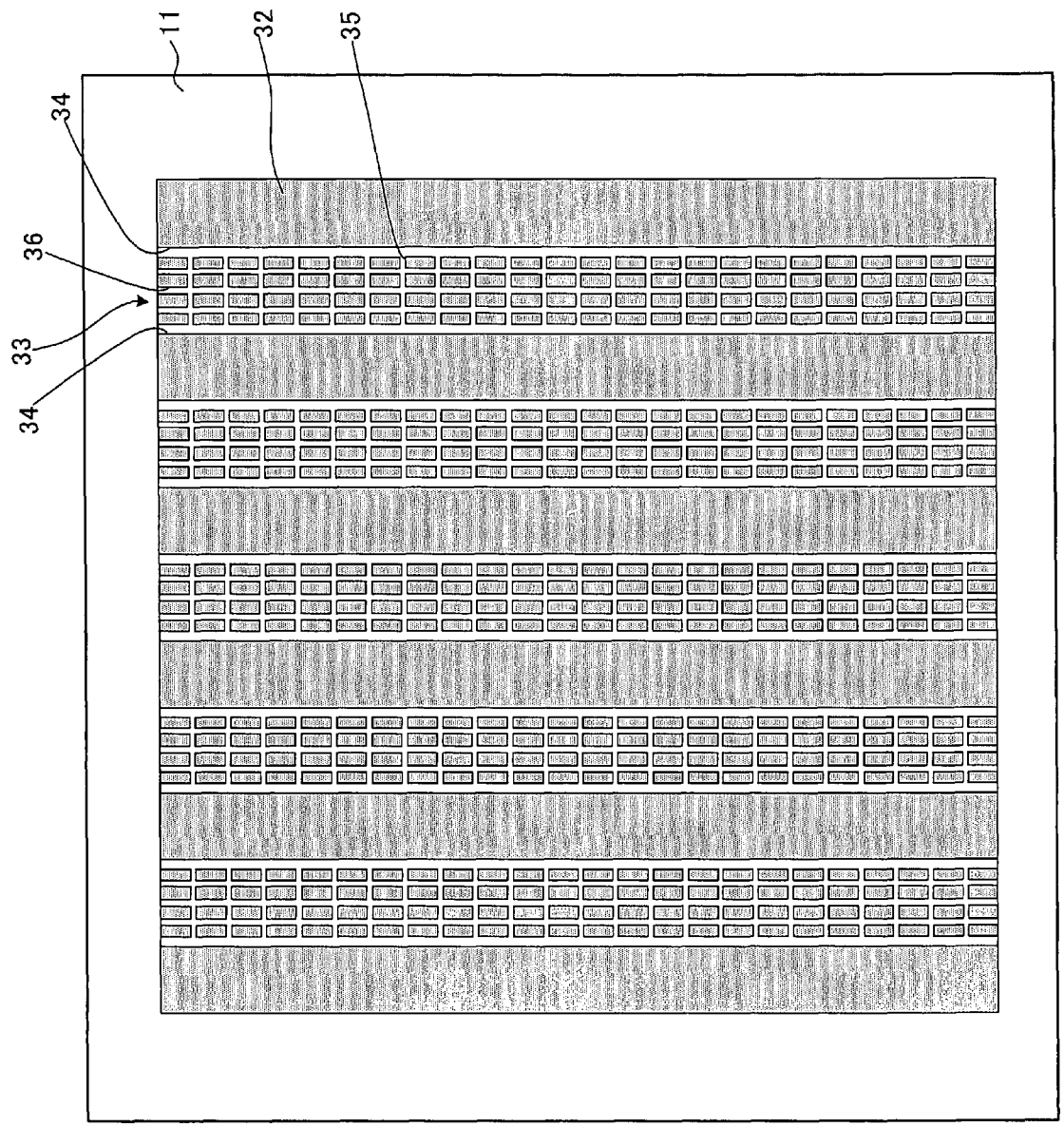
FIG. 25 is a plan view showing a part of the electrostatic capacitive touch switch of FIG. 24.
Figure 26:
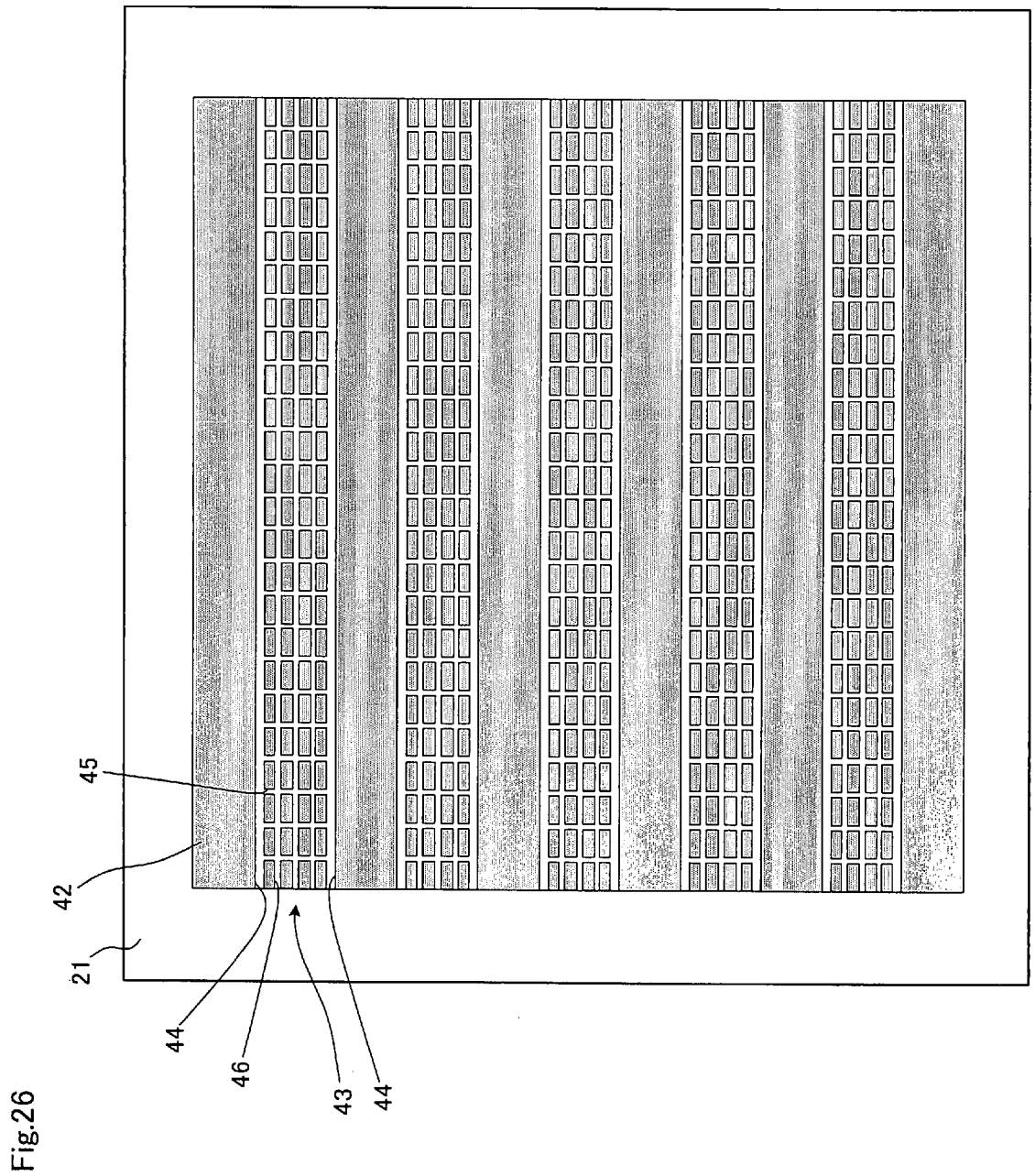
FIG. 26 is a plan view showing another part of the electrostatic capacitive touch switch of FIG. 24.

As shown in the plan views of FIGS. 25 and 26, the belt-like transparent conductive members 32 and 42 and the belt-like transparent controlling members 33 and 43 have a rectangular shape, and they are alternately arranged side by side in a non-contact manner having insulating slits 34 and 44 from which the transparent substrates 11 and 21 are exposed in between. The belt-like transparent conductive members 32 and 42 are connected to an outside drive circuit (not shown) via a routed circuit (not shown) formed of conductive ink, etc., so that a voltage is applied thereto. The belt-like transparent conductive member 32 (belt-like transparent controlling member 33) of the first transparent planar body 1 and the belt-like transparent conductive member 42 (belt-like transparent controlling member 43) of the second transparent planar body 2 are disposed so as to intersect at right angles.

The belt-like transparent controlling members 33 and 43 comprise a plurality of resistive slits 35 and 45, which extend in the direction along which the belt-like transparent conductive members 32 and 42 and the belt-like transparent controlling members 33 and 43 are in adjacent, and the plurality of resistive slits 35 and 45 connect the adjacent insulating slits 34 and 44. The belt-like transparent controlling members 33 and 43 comprise separating slits 36 and 46 respectively to separate the belt-like transparent controlling members 33 and 43 along the insulating slits 34 and 44.

Figure 27:
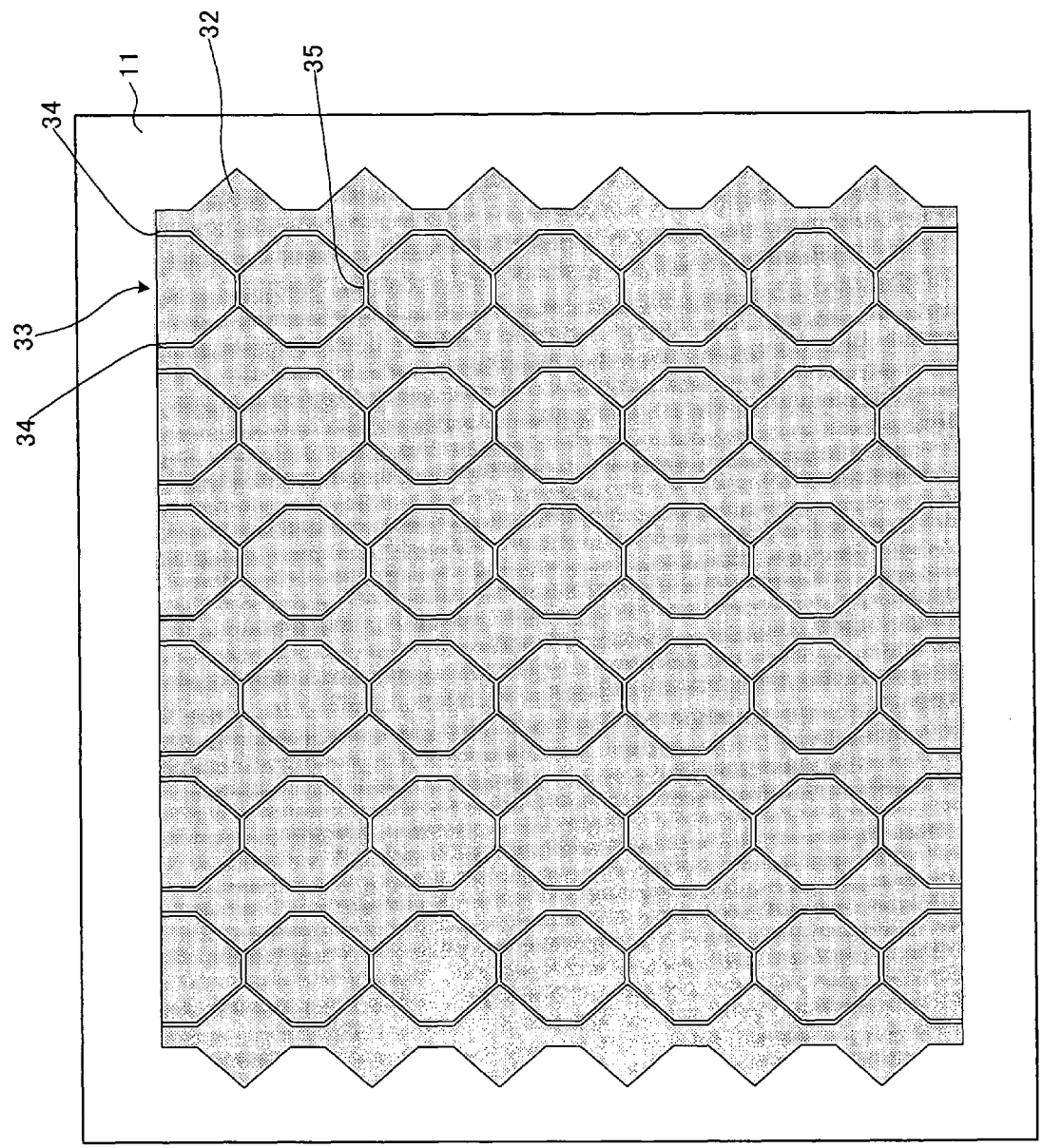
FIG. 27 is a plan view showing a part of a modification example of the electrostatic capacitive touch switch of FIG. 24.
Figure 28:
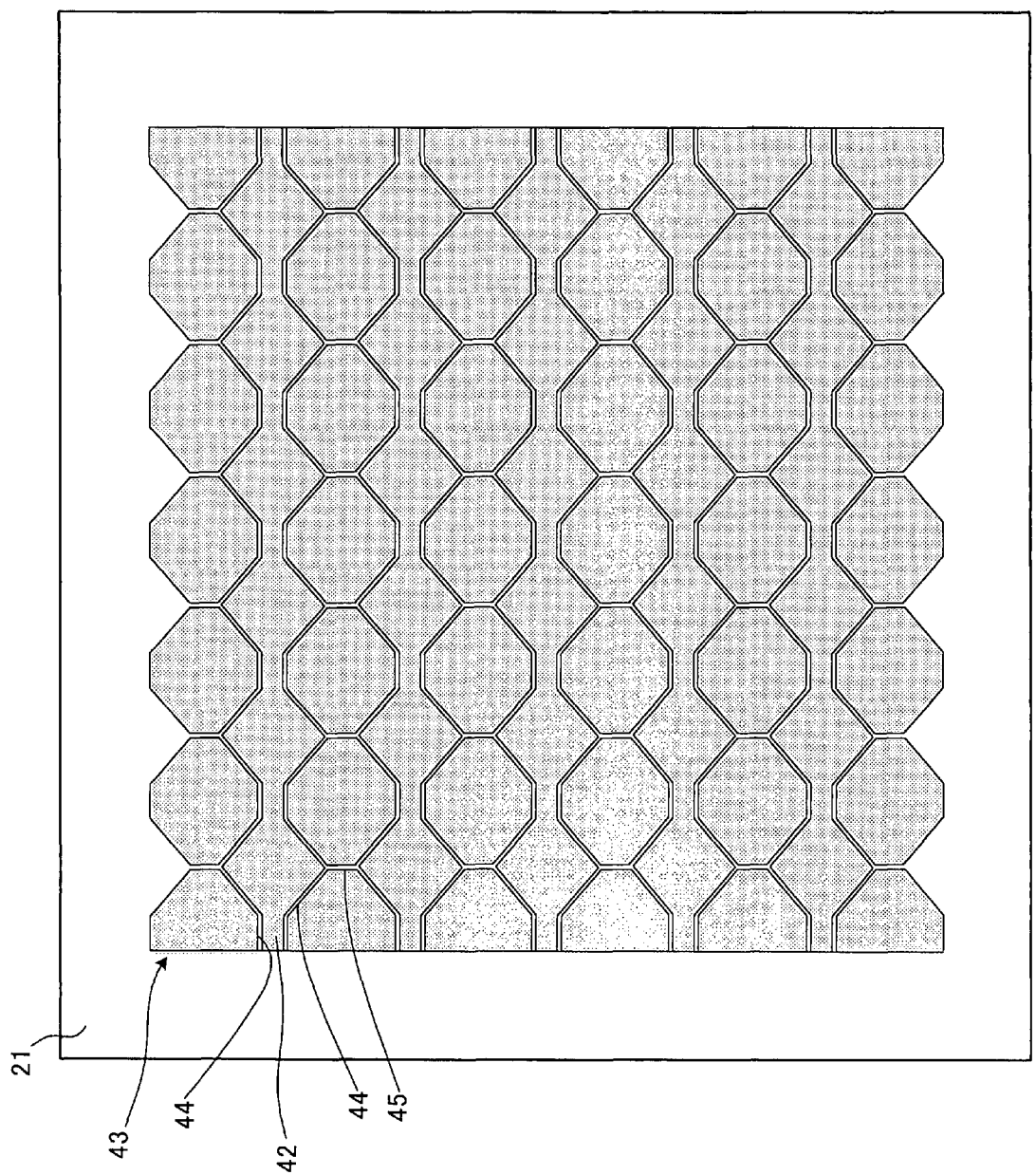
FIG. 28 is a plan view showing another part of a modification example of the electrostatic capacitive touch switch of FIG. 24.

The shape of the belt-like transparent conductive members 32 and 42 is not limited to that of the present embodiment and they may have any shape as long as the point touched with a finger, etc., can be detected. For example, as shown in FIGS. 27 and 28, the belt-like transparent conductive members 32 and 42 may have a structure, wherein a plurality of diamond-shaped conductive members are linearly connected in such a manner that their connecting directions in the belt-like transparent conductive members 32 and 42 intersect perpendicularly, and the diamond-shaped conductive members do not overlap each other as seen in a plan view. Note that with regard to operating performances, such as resolution of the transparent touch switch 101, it is preferable that the area without the belt-like transparent conductive members 32 and 42 be made as small as possible when the first transparent planar body 1 and the second transparent planar body 2 are overlapped. From this point of view, a structure wherein a plurality of diamond-shaped conductive members are linearly connected is more preferable than rectangularly forming the belt-like transparent conductive members 32 and 42.

As described above, by arranging the upper and lower diamond-shaped conductive members so as not to overlap as seen in a plan view and making the area where the conductive member is not formed as small as possible, the performance qualities of the transparent touch switch 101, such as the resolution, can be improved. This allows more accurate detection of the touched position. FIGS. 27 and 28 show a structure wherein the belt-like transparent controlling members 33 and 43 are not provided with the separating slits 36 and 46.

Examples of the materials for the belt-like transparent conductive members 32 and 42 and the belt-like transparent controlling members 33 and 43 include indium tin oxide (ITO), indium oxide, antimony-doped tin oxide, fluorine-doped tin oxide, aluminum-doped zinc oxide, potassium-doped zinc oxide, silicon-doped zinc oxide; zinc oxide-tin oxide, indium oxide-tin oxide, zinc oxide-indium oxide-magnesium oxide, zinc oxide, tin-oxide film and like transparent conductive materials; tin, copper, aluminum, nickel, chromium and like metal materials; and metal oxide materials. These materials may be used alone or in combination. Simple metals that are weak to acids or alkalis may also be used as a conductive material.

Zinc oxide (ZnO) is preferable for the material for the belt-like transparent conductive members 32 and 42 and the belt-like transparent controlling members 33 and 43, because it is less expensive than ITO, which is the most widely used material for touch switches, transparent electric conductors for liquid crystals, etc. In particular, when zinc oxide is used as a material for the electrostatic capacitive touch switch, because the adhesive layer 15 lies between the first transparent planar body 1 and the second transparent planar body 2 without any air layer, the belt-like transparent conductive members 32 and 42 and the belt-like transparent controlling members 33 and 43 formed of zinc oxide (ZnO) will not directly contact air. This prevents the zinc oxide (ZnO) from deteriorating due to oxidation and reduces the production costs of products (touch switch).

It is also possible to use composite materials wherein carbon nanotubes, carbon nanohorns, carbon nanowires, carbon nanofibers, graphite fibril and like superthin electric conduction carbon fibers are disposed in a polymer material, which functions as a binder, as materials for the belt-like transparent conductive members 32 and 42 and the belt-like transparent controlling members 33 and 43. It is also possible to provide an undercoat layer on the surface of the transparent substrates 11 and 21 to enhance the transparency and adherence thereof before forming the belt-like transparent conductive members 32 and 42 and the belt-like transparent controlling members 33 and 43.

The method for forming the belt-like transparent conductive members 32 and 42 and the belt-like transparent controlling members 33 and 43 is explained below. First, a conductive film having a uniform thickness is formed on one surface of the transparent substrates 11 and 21 using the above-described materials. Examples of the method for forming the conductive film include sputtering, vacuum deposition, ion plating and like PVD methods; CVD methods; coating methods; printing methods; etc. The thickness of the conductive film is generally about 5 to 100 nm Second, while irradiating the surface of the conductive films formed on the transparent substrates 11 and 21 with a laser, the transparent substrates 11 and 21 or the laser light are moved so as to remove the conductive film. Separation between the belt-like transparent conductive members 32 and 42 and the belt-like transparent controlling members 33 and 43 is thereby conducted. The portions where the conductive film is removed by the irradiation of laser light become insulating slits 34 and 44. Examples of the apparatus for use in laser light irradiation include a YAG laser, a carbon laser, etc. When the insulating slits 34 and 44 for separating the belt-like transparent conductive members 32 and 42 from the belt-like transparent controlling members 33 and 43 are formed using laser light as described above, it is possible to make the width of the insulating slits 34 and 44, for example, from 5 to 400 μm. This makes the boundaries between the belt-like transparent conductive members 32 and 42 and the belt-like transparent controlling members 33 and 43 inconspicuous, improving visibility. In particular, by making the width of the insulating slits 34 and 44 not more than 20 μm, the insulating slits 34 and 44 can be hardly recognized by visual observation. Therefore, it is preferable from the viewpoint of improving visibility.

Likewise, it is also possible to form the resistive slits 35 and 45 and the separating slits 36 and 46 as slits having a width of 5 to 400 μm by irradiating the surfaces of the belt-like transparent controlling members 33 and 43 with laser light so as to remove the conductive film. This makes the boundaries between the portions where the resistive slits 35 and 45 and/or the separating slits 36 and 46 are formed and not formed inconspicuous in the belt-like transparent controlling members 33 and 43. With the view of improving visibility, it is particularly preferable that the widths of the resistive slits 35 and 45 and the separating slits 36 and 46 be not more than 20 μm. As described later, in order to make the belt-like transparent controlling members 33 and 43 have a high impedance status so that electric current hardly flows therethrough, it is preferable that many resistive slits 35 and 45 and the separating slits 36 and 46 be formed to divide the belt-like transparent controlling members 33 and 43 into small portions. For example, when resistive slits each having a width of 5 μm are formed in the belt-like transparent controlling members 33 and 43, having a length of 60581.8 μm and a width of 4880 μm in such a manner that the resistive slits have a space of 5 μm therebetween, 6058 resistive slits can be formed at the maximum. It is preferable that the width of the resistive slit be 9 μm and 9 to 3366 resistive slits be formed. When a separating slit having a width of 5 μm is formed in the belt-like transparent controlling members 33 and 43 having the same size as described above, 486 separating slits can be formed at the maximum. It is preferable that the width of the separating slit be 9 μm and 0 to 269 separating slits be formed.

By forming 6058 resistive slits and 486 separating slits as described above, the belt-like transparent controlling members 33 and 43 can be divided into 2,949,759 regions at the maximum. It is preferable that the belt-like transparent controlling members 33 and 43 be divided into 8 to 908,550 regions.

Attachment between the first transparent planar body 1 and the second transparent planar body 2 is preferably conducted in such a manner that an adhesive layer 15 lies on the entire attachment surface so as to avoid formation of an air layer. The adhesive layer 15 may be formed of epoxy-based, acryl-based and like generally used transparent adhesive, and may include a core material formed from a transparent film of norbornene-based resin. The thickness of the adhesive layer 15 is preferably not more than 500 μm, more preferably 20 to 80 μm, and still more preferably 50 to 80 rpm. The adhesive layer may be formed by layering a plurality of sheets of a single type of sheet-like adhesive material or a plurality of types of sheet-like adhesive materials.

In the transparent touch switch 101 having the above structure, the method for detecting the position touched is the same as that in known electrostatic capacitive touch switches. Specifically, the front surface of the first transparent planar body 1 is touched with a finger or the like at any point, the transparent conductive films 12 and 22 are grounded through the electric capacity of a human body in the touched position. By detecting the current value which flows through the transparent electric conduction films 12 and 22 at this time, the coordinate of the touched position can be calculated.

In the transparent touch switch 101 of the present embodiment, the belt-like transparent controlling members 33 and 43 comprise a plurality of resistive slits 35 and 45, and therefore when the front surface of the first transparent planar body 1 is touched, capacitive coupling occurs between the belt-like transparent conductive members 32 and 42 and the belt-like transparent controlling members 33 and 43, which are disposed adjacent to the belt-like transparent conductive members 32 and 42. In this structure, even if a slight amount of electrical current flows to the belt-like transparent controlling members 33 and 43, the impedance becomes high in the belt-like transparent controlling members 33 and 43 and therefore electrical current can hardly flow therethrough. This makes it possible to allow sufficient amount of current flow into the belt-like transparent conductive members 32 and 42, which are used to detect the touched position. Accordingly, reliable detection of the difference in the current flowing through the belt-like transparent conductive members 32 and 42 when the front surface of the first transparent planar body 1 is touched with a finger or the like, and when not touched can be conducted, so that the coordinate of the touched position can be accurately detected.

In the fourth embodiment, the resistive slits 35 and 45 are structured so as to connect the insulating slits 34 and 44 to each other, which are disposed adjacent to the belt-like transparent controlling members 33 and 43, and therefore current flow in the longitude direction of the belt-like transparent controlling members 33 and 43 can be reliably prevented. This further ensures that a satisfactory amount of current flows into the belt-like transparent conductive members 32 and 42. This makes it possible to detect the difference in the current flowing through the belt-like transparent conductive members 32 and 42 when the front surface of the first transparent planar body 1 is touched with a finger or the like, and when not touched in a more reliable manner, and detect the coordinate of the touched position in a more accurate manner.

In the fourth embodiment, the belt-like transparent controlling members 33 and 43 comprise the separating slits 36 and 46 along the insulating slits 34 and 44 for separating the belt-like transparent controlling members 33 and 43. This structure can prevent current from flowing through the belt-like transparent controlling members 33 and 43 in the direction where the belt-like transparent conductive members 32 and 42 and the belt-like transparent controlling members 33 and 43 are adjacent. This imparts the belt-like transparent controlling members 33 and 43 with a further higher impedance status and allows accurate detection of the touched position.

Figure 29:
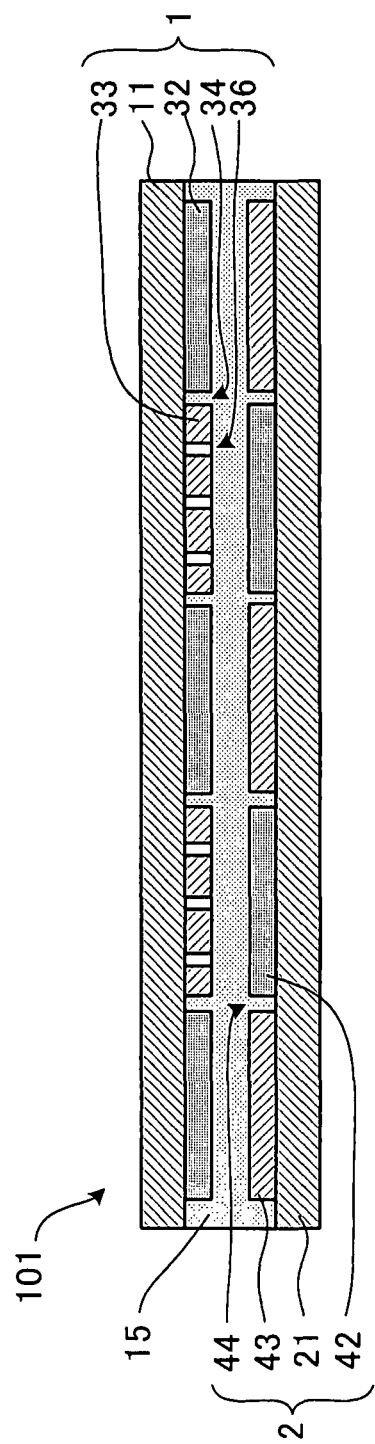
FIG. 29 is a schematic cross-sectional view showing a modification example of the electrostatic capacitive touch switch of FIG. 24.

The fourth embodiment of the present invention is explained above; however, the specific structure of the present invention is not limited to this embodiment. In the first transparent planar body 1 and the second transparent planar body 2 of the present embodiment, each of the belt-like transparent controlling members 33 and 43 is provided with the resistive slits 35 and 45 and the separating slits 36 and 46 respectively. However, it is also possible to employ a structure shown in FIG. 29, wherein the resistive slit 45 and the separating slit 46 are omitted in a belt-like transparent adjustor 43 in the second transparent planar body 2. Even in this structure, because the resistive slit 35 and the separating slit 36 are formed in the belt-like transparent adjustor 33 of the first transparent planar body 1, which is touched with a finger, etc., the belt-like transparent adjustor 33 achieves a high impedance status and electric current can hardly flow therethrough. As a result, a satisfactory amount of current flowing into the belt-like transparent conductive members 32 and 42, which is used for detecting the touched position, can be allocated. The difference in the current flowing through the belt-like transparent conductive members 32 and 42 when the front surface of the first transparent planar body 1 is touched with a finger or the like, and when not touched can thereby be reliably detected, and the coordinate of the touched position can be accurately detected.

Figure 30:
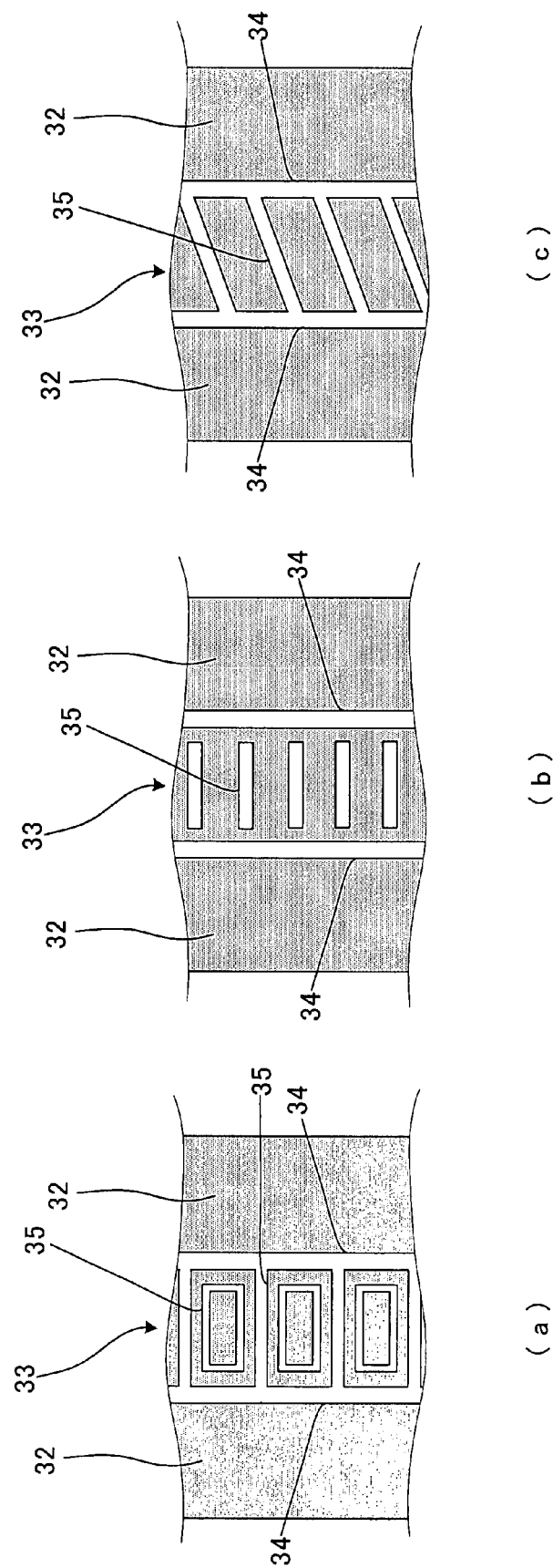
FIGS. 30(a) to 30(c) are enlarged plan views showing primary parts of various modifications of resistive slits.
Figure 31:
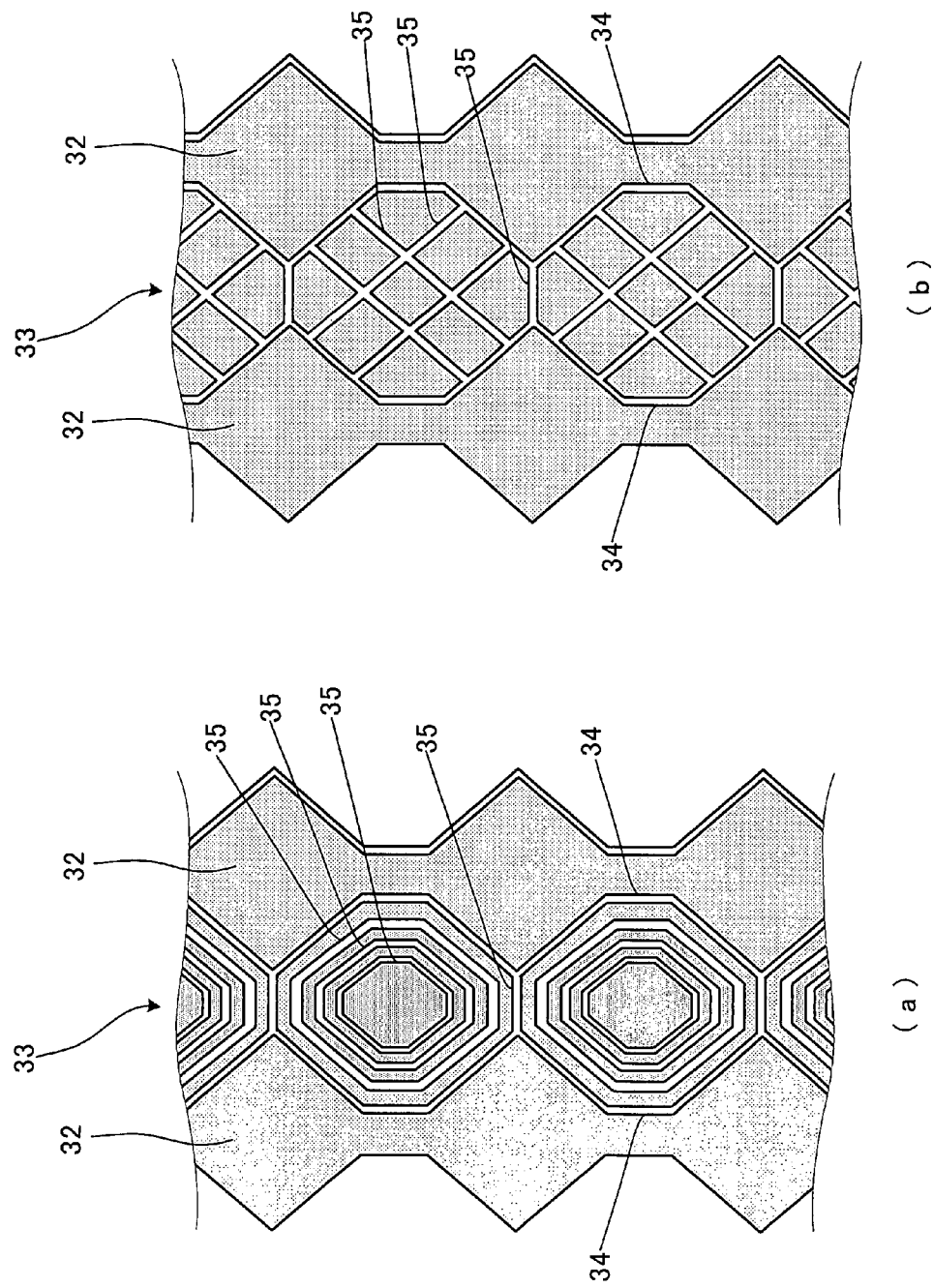
FIGS. 31(a) and 31(b) are enlarged plan views showing primary parts of various modifications of resistive slits.

The shape of the resistive slits 35 and 45 of the fourth embodiment is not limited to that described above and may be various shapes as shown in FIGS. 30(a) to 30(c) and FIGS. 31(a) and 31(b), which are enlarged views of principal parts. In FIG. 30, the belt-like transparent conductive members 32 and 42 are rectangular. In FIG. 31, the belt-like transparent conductive members 32 and 42 are formed as a linearly connected plurality of diamond-shaped conductive members.

Figure 32:
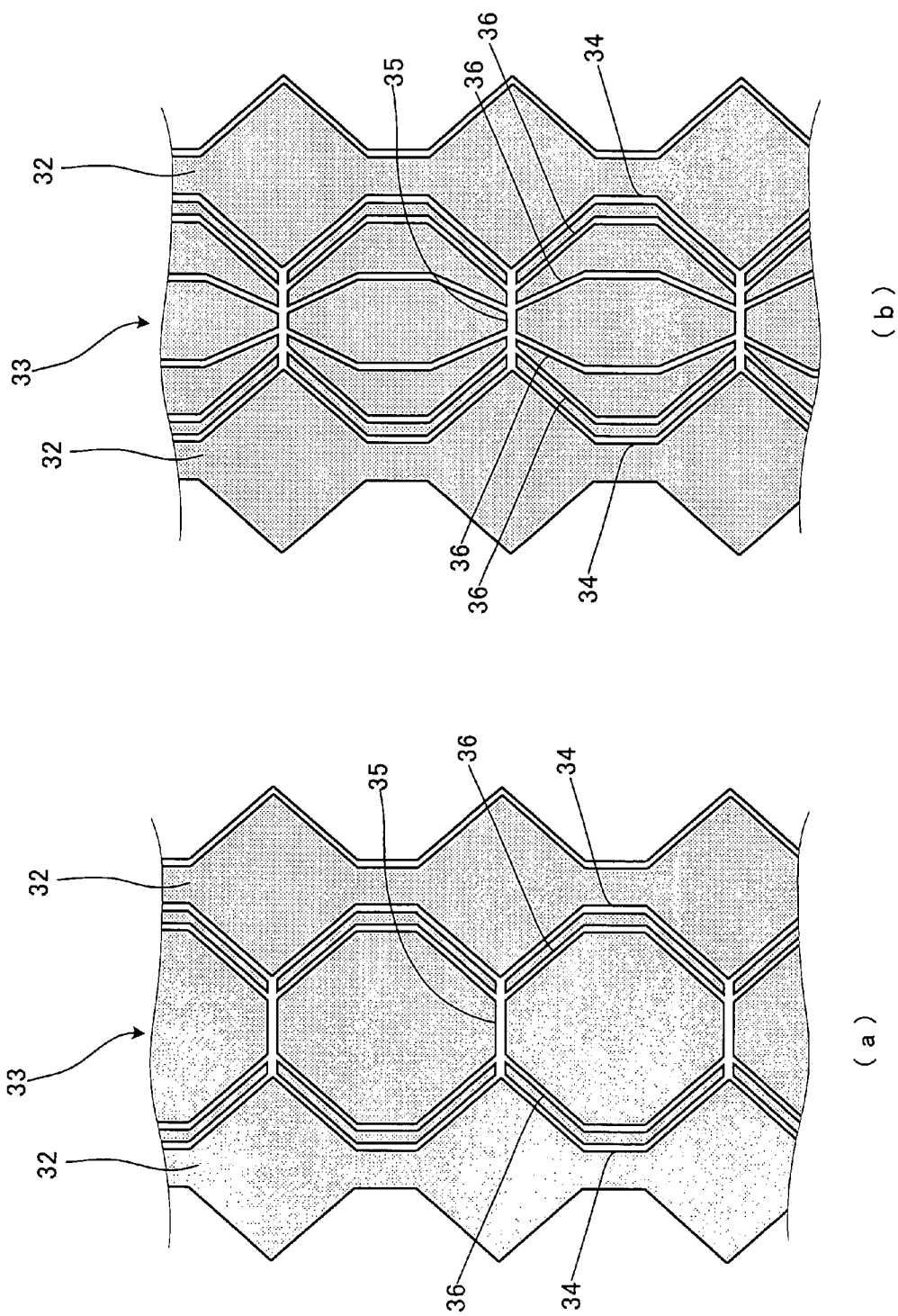
FIGS. 32(a) and 32(b) are enlarged plan views showing primary parts of various modifications of resistive slits.

The shape of the separating slits 36 and 46 is also not limited to that described above and may be various shapes as shown in the enlarged views of the principal parts of FIGS. 32(a) and 32(b). In FIG. 32, the belt-like transparent conductive members 32 and 42 are formed as a linearly connected plurality of diamond-shaped conductive members. It is also possible to employ a structure wherein the separating slits 36 and 46 are omitted.

In the present embodiment, the electrostatic capacitive touch switch 101 is formed by attaching the first transparent planar body 1 to the second transparent planar body 2 via the adhesive layer 15. However, it is also possible to obtain a transparent resistive film-type touch switch by disposing the first transparent planar body 1 and the second transparent planar body 2 in such a manner that the belt-like transparent conductive members 32 and 42 face each other with a predetermined space therebetween produced by a spacer.

In the transparent touch switch having the above structure, the method for detecting the touched position is the same as that in known electrostatic capacitive touch switches. Specifically, when the front surface of the first transparent planar body 1 is touched with a finger or the like at any point, the belt-like transparent conductive members 32 and 42 are grounded. By measuring the resistance at the touched point in a time-sharing manner in the vertical and horizontal directions, the coordinate of the touched position can be calculated.

In the transparent touch switch 101 of the fourth embodiment, a linear polarizing plate may be provided on the front side (that is opposite the surface on which the transparent conductive film 12 is formed) of the first transparent planar body 1. If a linear polarizing plate is provided, the transparent substrates 11 and 21 should be made of an optical isotropic material. One example of the linear polarizing plate is an oriented film of polyvinyl alcohol (PVA) to which iodine, dichromatic dye or like dichromatic coloring matter is adsorbed and oriented. The linear polarizing plate may be formed by attaching a triacetyl acetate (TAC) film, which functions as a protective film, to both surfaces of the thus obtained oriented film so as to sandwich it. Optically isotropic materials are those having no polarization to any incidental light, such as polycarbonate (PC), polyether sulfone (PES), polyacrylic acid (PAC), amorphous polyolefin resins, cyclic polyolefin resins, aliphatic cyclic polyolefin, norbornene thermoplastic transparent resins, glass materials, etc. Examples of the methods for forming the transparent substrates 11 and 21 using these materials include casting and extrusion.

Such arrangements can reduce the amount of reflected light attributable to the visible light incident in the touch switch to about half or less of the case when the linear polarizing plate is not provided. This arrangement also makes the transparent conductive films 12 and 22 more inconspicuous and improves visibility.

It is also possible to provide a circular polarization component by fully attaching a linear polarizing plate with a quarter-wave plate, and fully attaching the quarter-wave plate with the touch switch 101 on the opposite surface (i.e., the back surface of the second transparent planar body 2). The quarter-wave plate may be formed by extending a film formed of polyvinyl alcohol (PVA), polycarbonate (PC), norbornene thermoplastic resin, cyclic polyolefin resin or the like to impart multiple flexibilities. It is preferable that the linear polarizing plate be fully attached with the quarter-wave plate having an adhesive layer formed of the materials usable for the adhesive layer 15 in between in such a manner that the formation of an air layer is prevented. Likewise, it is also preferable that the quarter-wave plate be attached to the second transparent planar body on the back side with an adhesive layer formed of the materials usable for the adhesive layer 15 lying in between so as to prevent formation of an air layer. In this case, it is preferable that the quarter-wave plates be arranged in such a manner that the optical axis of one quarter-wave plate perpendicularly intersects with the axis of the other quarter-wave plate.

By forming a circular polarization component in the manner as described above, it is possible to circularly polarize the reflected light and reduce internal reflection in the touch switch in the portion sandwiched between two quarter-wave plates, obtaining satisfactory low reflection properties. This arrangement also makes the belt-like transparent conductive members 32 and 42 more inconspicuous and improves visibility. Note that the transparent substrates 11 and 21 may be formed from a quarter-wave plate or a laminate comprising a linear polarizing plate.

Figure 33:
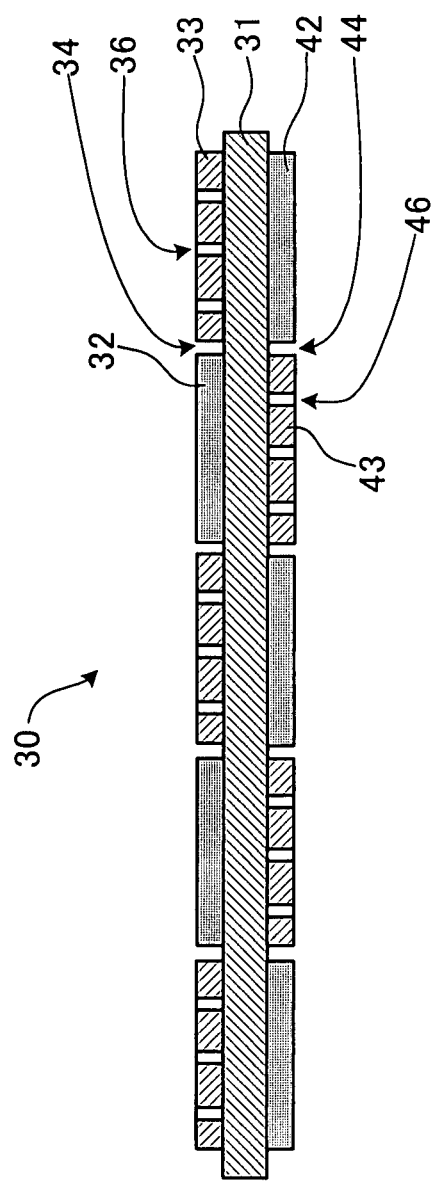
FIG. 33 is a schematic cross-sectional view showing a modification example of the transparent planar body.

It is also possible to employ the structure as shown in the schematic cross-sectional view of FIG. 33, wherein a plurality of belt-like transparent conductive members 32 and 42 are formed on both surfaces of one transparent substrate 31 with a predetermined space therebetween; belt-like transparent controlling members 33 and 43 having a plurality of resistive slits 35 and 45 and a plurality of separating slits 36 and 46 are provided between each of the belt-like transparent conductive members 32 and 42 respectively; and the belt-like transparent conductive members 32 and 42 and the belt-like transparent controlling members 33 and 43 are disposed side by side via the insulating slits 34 and 44. The belt-like transparent conductive members 32 and 42 and the belt-like transparent controlling members 33 and 43 formed on both surfaces of the transparent substrate 31 are disposed so that they intersect at right angles in the longitudinal direction. When an electrostatic capacitive touch switch is formed by using a transparent planar body 30 having such a structure, attachment of two transparent planar bodies (corresponding to the first transparent planar body 1 and the second transparent planar body 2) via the adhesive layer 15 becomes unnecessary, improving the productivity. Furthermore, because the touch switch comprises only one transparent substrate 31 and an adhesive layer 15 is unnecessary, the touch switch can be made thinner.

Such a transparent planar body 30 can be formed in the following manner. First, a conductive film is formed on both surfaces of one transparent substrate 31. Second, one surface of the transparent substrate 31 is irradiated with laser light to remove the conductive film, so that the belt-like transparent conductive member 32 and the belt-like transparent controlling member 33 are formed. Third, the other surface of the transparent substrate 31 is irradiated with laser light to remove the conductive film, so that the belt-like transparent conductive member 42 and the belt-like transparent controlling member 43 are formed in the same manner as described above. When the belt-like transparent conductive members 32 and 42, etc., are formed on both surfaces of the transparent substrate 31, the transparent substrate should be carefully handled during the film-formation step and processing step so that the conductive films formed on both surfaces may not be damaged.

The invention claimed is:

1. A transparent planar body comprising:
a transparent substrate;
a patterned transparent conductive film provided on at least one surface of the transparent substrate, the patterned transparent conductive film having a thickness within the range of 10 to 25 nm; and
an adjusting laminate for equalizing the reflectance of light that is transmitted through a patterned region where the transparent conductive film is provided via the transparent substrate with that transmitted through a non-patterned region where the transparent conductive film is not provided,
wherein the adjusting laminate is provided with an undercoat laminate comprising a low refractive index layer and a high refractive index layer whose light refractive index is higher than that of the low refractive index layer,
the undercoat laminate lies between the transparent substrate and the transparent conductive film in such a manner that the transparent conductive film is disposed on the low refractive index layer side, and
the high refractive index layer is thinner than the low refractive index layer, and the thickness of the high refractive index layer falls within the range of 10 to 25 nm and that of the low refractive index layer falls within the range of 25 to 45 nm.

2. A transparent planar body according to claim 1, wherein the thickness of the high refractive index layer falls within the range of 10 to 20 nm.

3. A transparent planar body according to claim 2, wherein the high refractive index layer is formed of a silicon-tin oxide and the low refractive index layer is formed of a silicon oxide.

4. A transparent electrostatic capacitive touch switch comprising a plurality of transparent planar bodies of claim 1, the plurality of transparent planar bodies being attached to each other via an adhesive layer.

5. A transparent electrostatic capacitive touch switch comprising a plurality of transparent planar bodies according to claim 1,
the plurality of transparent planar bodies being attached to each other via an adhesive layer in such a manner that the transparent conductive films face each other,
the thickness of the transparent conductive film being 20 to 25 nm, and
the refractive index of the adhesive layer being not less than 1.6.

6. A transparent electrostatic capacitive touch switch comprising a plurality of transparent planar bodies according to claim 1,
the plurality of transparent planar bodies being attached to each other via an adhesive layer in such a manner that the transparent conductive films face each other,
the thickness of the transparent conductive film being 25 to 30 nm, and
the refractive index of the adhesive layer being not less than 1.7.

7. A transparent touch switch according to any one of claims 4 to 6, which further comprises a linear polarizing plate on a front side thereof.

8. A transparent touch switch according to any one of claims 4 to 6, which further comprises a linear polarizing plate and a quarter-wave plate on a front side thereof and a quarter-wave plate on a back side thereof.

9. A transparent touch switch according to claim 7, wherein the transparent substrate is a quarter-wave plate.

10. A transparent touch switch according to claim 8, wherein the transparent substrate is a quarter-wave plate.

* * * * *

UNITED STATES PATENT AND TRADEMARK OFFICE
CERTIFICATE OF CORRECTION

| | | |
|---|---|---|
| PATENT NO. | : 8,603,611 B2 | Page 1 of 1 |
| APPLICATION NO. | : 11/795009 | |
| DATED | : December 10, 2013 | |
| INVENTOR(S) | : Naohiro Wakabayashi et al. | |

It is certified that error appears in the above-identified patent and that said Letters Patent is hereby corrected as shown below:

Title page

Item (86), correct the PCT No.

"PCT/JP2006/010383" to

-- PCT/JP2006/310383 --

Signed and Sealed this
Sixth Day of May, 2014

Michelle K. Lee
*Deputy Director of the United States Patent and Trademark Office*